US010645641B2

United States Patent
Li et al.

(10) Patent No.: US 10,645,641 B2
(45) Date of Patent: May 5, 2020

(54) GROUP COMMON PDCCH DESIGN IN NR

(71) Applicant: Mediatek Inc., Hsin-Chu (TW)

(72) Inventors: Chien-Chang Li, Hsinchu (TW); Yiju Liao, Hsinchu (TW); Chien Hwa Hwang, Hsinchu (TW); Pei-Kai Liao, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 89 days.

(21) Appl. No.: 15/971,123

(22) Filed: May 4, 2018

(65) Prior Publication Data

US 2018/0324689 A1 Nov. 8, 2018

Related U.S. Application Data

(60) Provisional application No. 62/501,947, filed on May 5, 2017.

(51) Int. Cl.
*H04W 48/16* (2009.01)
*H04L 27/26* (2006.01)
(Continued)

(52) U.S. Cl.
CPC .......... *H04W 48/16* (2013.01); *H04L 5/0094* (2013.01); *H04L 27/2602* (2013.01); *H04W 52/14* (2013.01); *H04W 72/042* (2013.01); *H04W 72/0446* (2013.01); *H04W 72/121* (2013.01); *H04W 72/14* (2013.01); *H04W 74/0808* (2013.01); *H04L 5/005* (2013.01); (Continued)

(58) Field of Classification Search
None
See application file for complete search history.

(56) References Cited

U.S. PATENT DOCUMENTS

2016/0352551 A1   12/2016  Zhang et al.
2018/0062811 A1*   3/2018  Akkarakaran ........ H04L 1/0006
(Continued)

FOREIGN PATENT DOCUMENTS

CN      106231677 A    12/2016

OTHER PUBLICATIONS

3GPP TSG RAN WG1 Meeting #87, Reno, U.S.A., R1-1612190, Source: CMCC, Title: Discussion on DCI contents for NR PDCCH, Agenda item: 7.1.4.1, Document for: Discussion & Decision, 2016.
(Continued)

*Primary Examiner* — Otis L Thompson, Jr.
(74) *Attorney, Agent, or Firm* — Locke Lord LLP; Tim Tingkang Xia, Esq.

(57) ABSTRACT

In an aspect of the disclosure, a method, a computer-readable medium, and an apparatus are provided. The apparatus may be a user equipment (UE). The UE receives symbols in a first time slot. The first time slot includes a control region and a data region. The UE attempts to detect, when the UE is configured to detect, a group common downlink control channel carried by the received symbols. The group common downlink control channel contains common information directed to a group of UEs including the UE. When the detection is successful, the UE determines, based on the common information, at least one of (a) a first slot configuration, (b) a puncture configuration, (c) a transmission burst duration, and (d) one or more sub-regions of the control region.

17 Claims, 16 Drawing Sheets

(51) Int. Cl.
- *H04L 5/00* (2006.01)
- *H04W 52/14* (2009.01)
- *H04W 72/04* (2009.01)
- *H04W 72/12* (2009.01)
- *H04W 72/14* (2009.01)
- *H04W 74/08* (2009.01)
- *H04L 25/02* (2006.01)
- *H04W 24/10* (2009.01)

(52) U.S. Cl.
CPC .......... *H04L 5/0051* (2013.01); *H04L 5/0053* (2013.01); *H04L 25/0224* (2013.01); *H04L 27/26* (2013.01); *H04W 24/10* (2013.01); *H04W 52/146* (2013.01)

(56) References Cited

U.S. PATENT DOCUMENTS

| | | | | |
|---|---|---|---|---|
| 2018/0070341 A1* | 3/2018 | Islam | .................... | H04L 1/1887 |
| 2018/0219606 A1* | 8/2018 | Ng | ........................ | H04B 7/0617 |
| 2018/0220400 A1* | 8/2018 | Nogami | ................ | H04L 5/0078 |
| 2018/0234955 A1* | 8/2018 | Lin | ..................... | H04W 72/042 |
| 2018/0262311 A1* | 9/2018 | Wang | .................... | H04L 5/0044 |
| 2018/0279297 A1* | 9/2018 | Nogami | .................... | H04L 1/08 |
| 2018/0288746 A1* | 10/2018 | Zhang | .................... | H04L 1/0031 |
| 2018/0309513 A1* | 10/2018 | Kim | .................... | H04B 7/2643 |
| 2018/0324765 A1* | 11/2018 | Nammi | ............... | H04W 72/121 |
| 2018/0324770 A1* | 11/2018 | Nogami | ................ | H04L 5/0053 |
| 2018/0324816 A1* | 11/2018 | Islam | .................... | H04L 5/0048 |
| 2019/0053318 A1* | 2/2019 | Nogami | ................ | H04W 76/27 |
| 2019/0082448 A1* | 3/2019 | Nogami | ............ | H04W 72/1289 |
| 2019/0165904 A1* | 5/2019 | Jo | .......................... | H04L 5/005 |

OTHER PUBLICATIONS

3GPP TSG RAN WG1 AH_NR Meeting, Spokane, USA, R1-1700642, Agenda item: 5.1.3.4, Source: Sequans Communications, Title: On dynamic resource sharing between URLLC and eMBB in DL, Document for: Discussion and decision, 2017.

TSG-RAN WG1 NR Ad-hoc Meeting, Spokane, USA, R1-1700972, Source: Samsung, Title: Summary of e-mail discussions on multiplexing eMBB and URLLC in DL, Agenda Item: 5.1.3.4, Document for: Discussion and Decision, 2017.

International Search Report of PCT/CN2018/085849, dated Jul. 27, 2018.

* cited by examiner

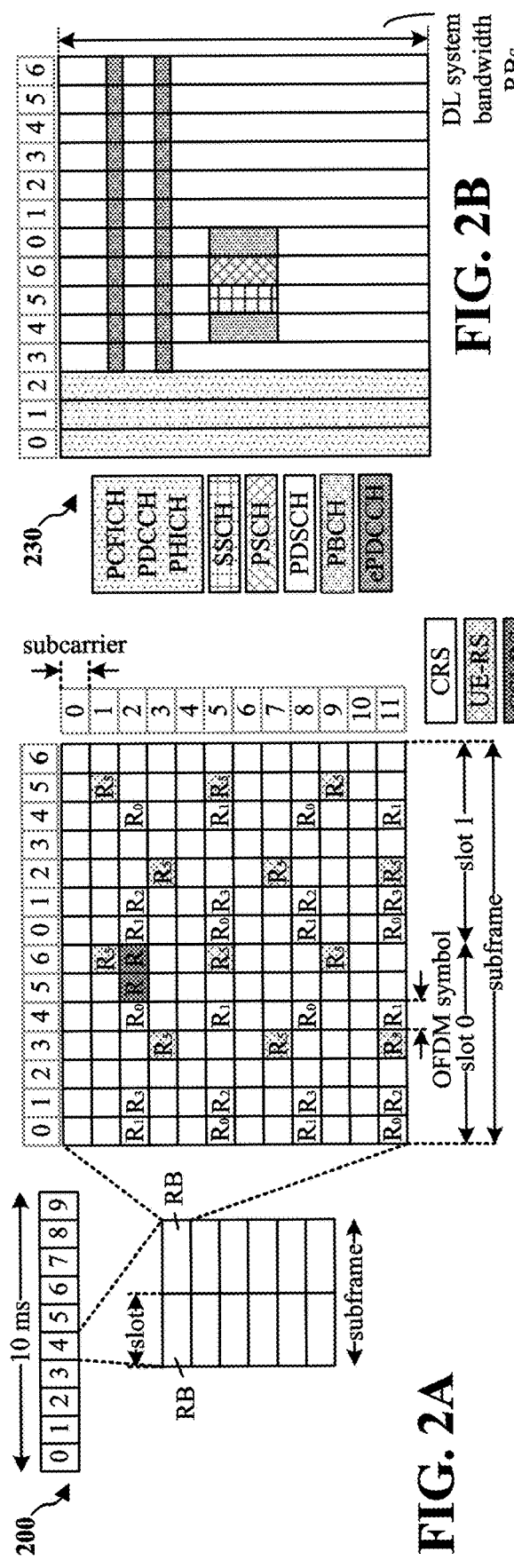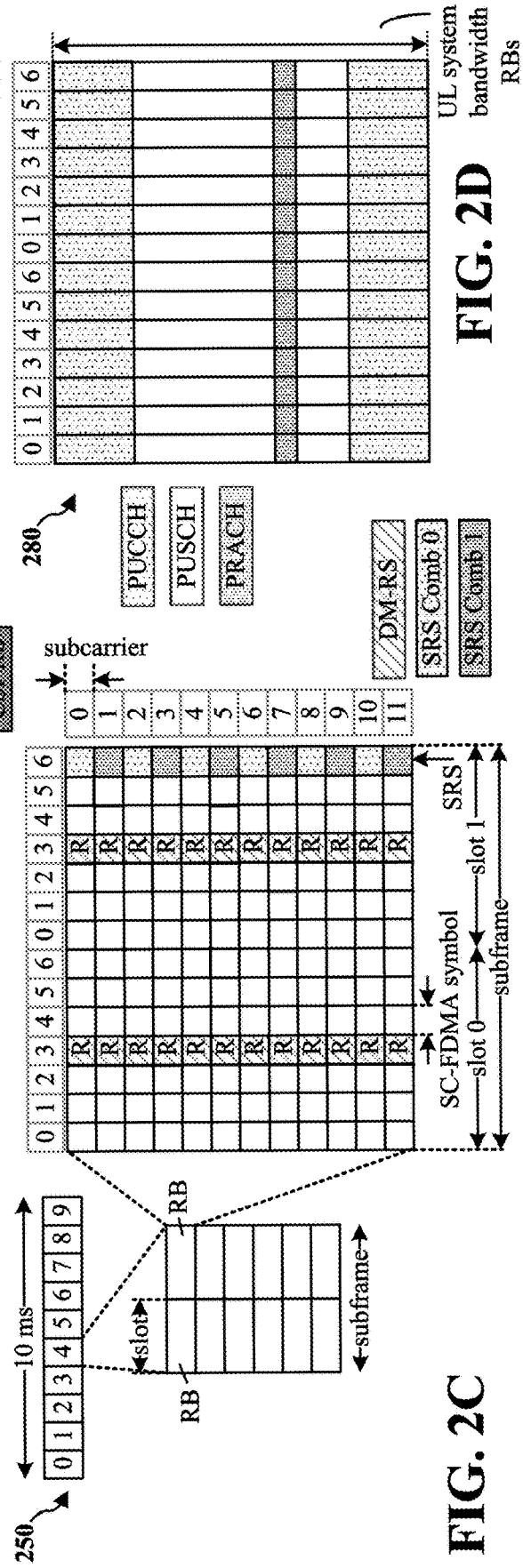

GROUP COMMON PDCCH DESIGN IN NR

CROSS-REFERENCE TO RELATED APPLICATION(S)

This application claims the benefit of U.S. Provisional Application Ser. No. 62/501,947 Filed May 5, 2017, entitled "GROUP COMMON PDCCH DESIGN IN NR," which is expressly incorporated by reference herein in its entirety.

BACKGROUND

Field

The present disclosure relates generally to communication systems, and more particularly, to user equipment (UE) that processes group common PDCCH.

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE of a wireless communication system. The UE receives symbols in a first time slot. The first time slot includes a control region and a data region. The UE attempts to detect, when the UE is configured to detect, a group common downlink control channel carried by the received symbols. The group common downlink control channel contains common information directed to a group of UEs including the UE.

When the detection is successful, the UE determines, based on the common information, at least one of (a) a first slot configuration of one or more time slots, (b) a puncture configuration indicating one or more punctured symbols received in a second time slot, the one or more punctured symbols being initially allocated for carrying enhanced Mobile Broadband (eMBB) data and carrying Ultra-Reliable and Low Latency Communications (URLLC) data, the second time slot being prior to the first time slot, (c) a transmission burst duration of a transmission on an unlicensed link, the unlicensed link being in an unlicensed spectrum, and (d) one or more sub-regions of the control region containing one or more of the received symbols that are a part of a downlink data channel, the downlink data channel including one or more of the received symbols in the data region.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a DL frame structure, DL channels within the DL frame structure, an UL frame structure, and UL channels within the UL frame structure, respectively.

DETAILED DESCRIPTION

Figure 1:
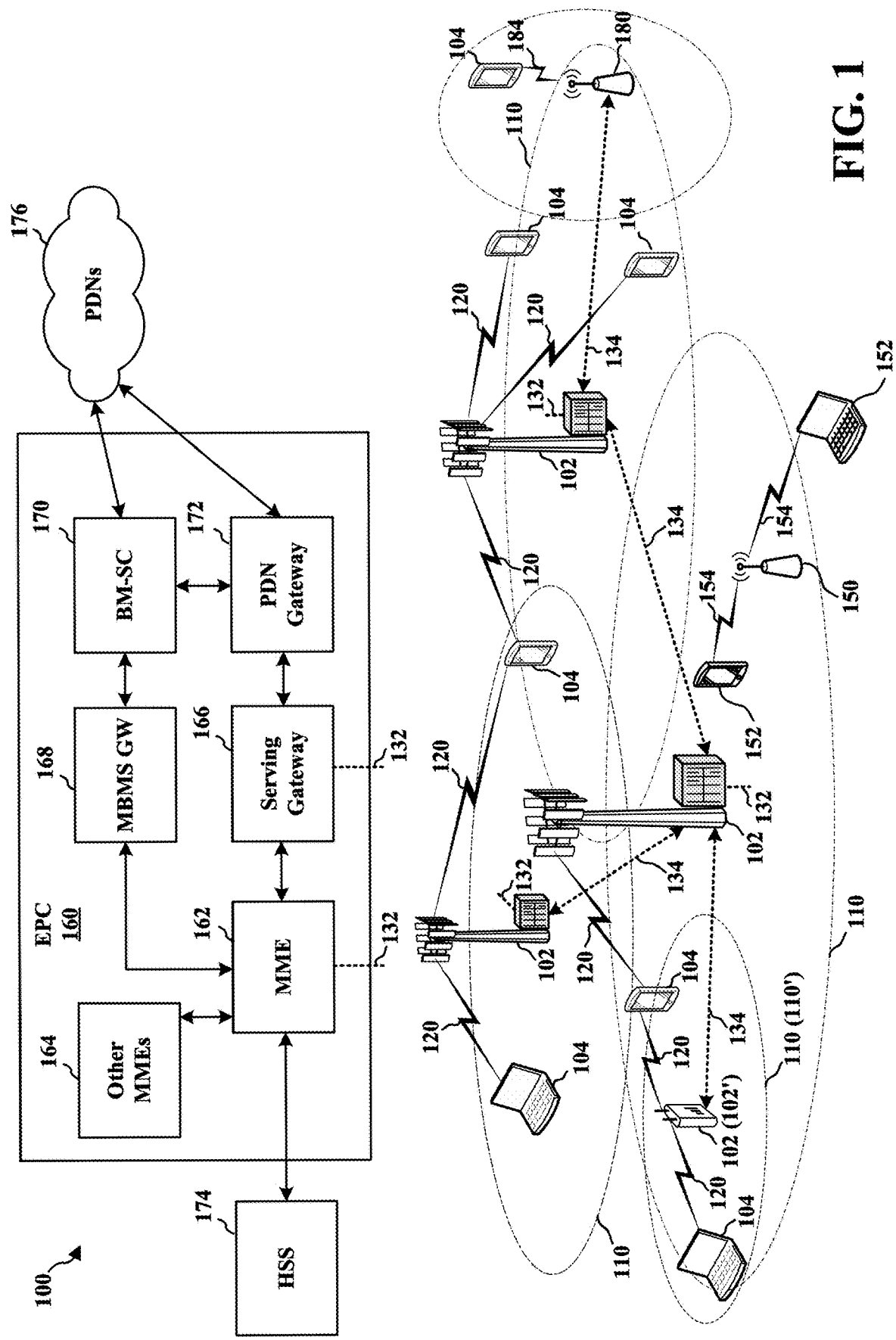
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is coupled to the PDN Gateway 172. The PDN Gateway 172 provides UE IP address allocation as well as other functions. The PDN Gateway 172 and the BM-SC 170 are coupled to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In certain aspects, the UE 104 determines, via a CSI component 192, a plurality of messages containing channel state information to be reported to a base station. The UE 104 also determines, via a reporting module 194, a priority level for each of the plurality of messages based on at least one predetermined rule. The UE 104 further selects one or more messages from the plurality of messages based on priority levels of the plurality of messages. The UE 104 then sends the selected one or more messages to the base station.

In certain aspects, the UE 104 determines, via the CSI component 192, a first message and a second message containing channel state information to be reported to a base station. The UE 104 also determines, via the reporting module 194, that a priority level of the first message is higher than a priority level of the second message based on at least one predetermined rule. The UE 104 further maps sets of information bits of the first message to a first plurality of input bits of an encoder and sets of information bits of the second message to a second plurality of input bits of the encoder. The first plurality of input bits offer an error protection level higher than an error protection level offered by the second plurality of input bits.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as R0, R1, R2, and R3, respectively), UE-RS for antenna port 5 (indicated as R5), and CSI-RS for antenna port 15 (indicated as R). FIG.

2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
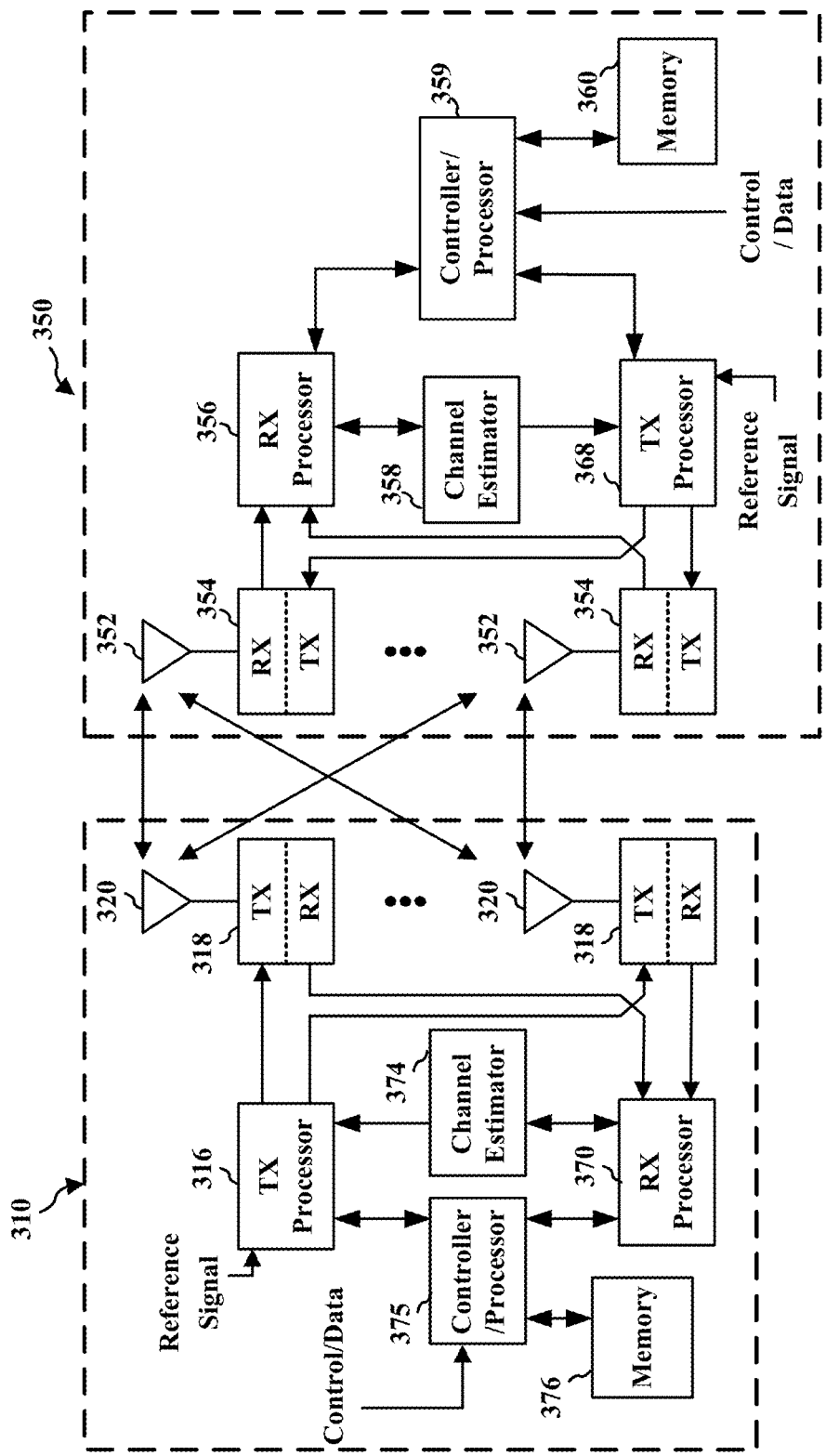
FIG. 3 is a diagram illustrating a base station in communication with a UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission. The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service.

A single component carrier bandwidth of 100 MHZ may be supported. In one example, NR resource blocks (RBs) may span 12 sub-carriers with a sub-carrier bandwidth of 75 kHz over a 0.1 ms duration or a bandwidth of 15 kHz over a 1 ms duration. Each radio frame may consist of 10 or 50 subframes with a length of 10 ms. Each subframe may have a length of 1 ms or 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7.

Beamforming may be supported and beam direction may be dynamically configured. MIMO transmissions with pre-coding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS); in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 4:
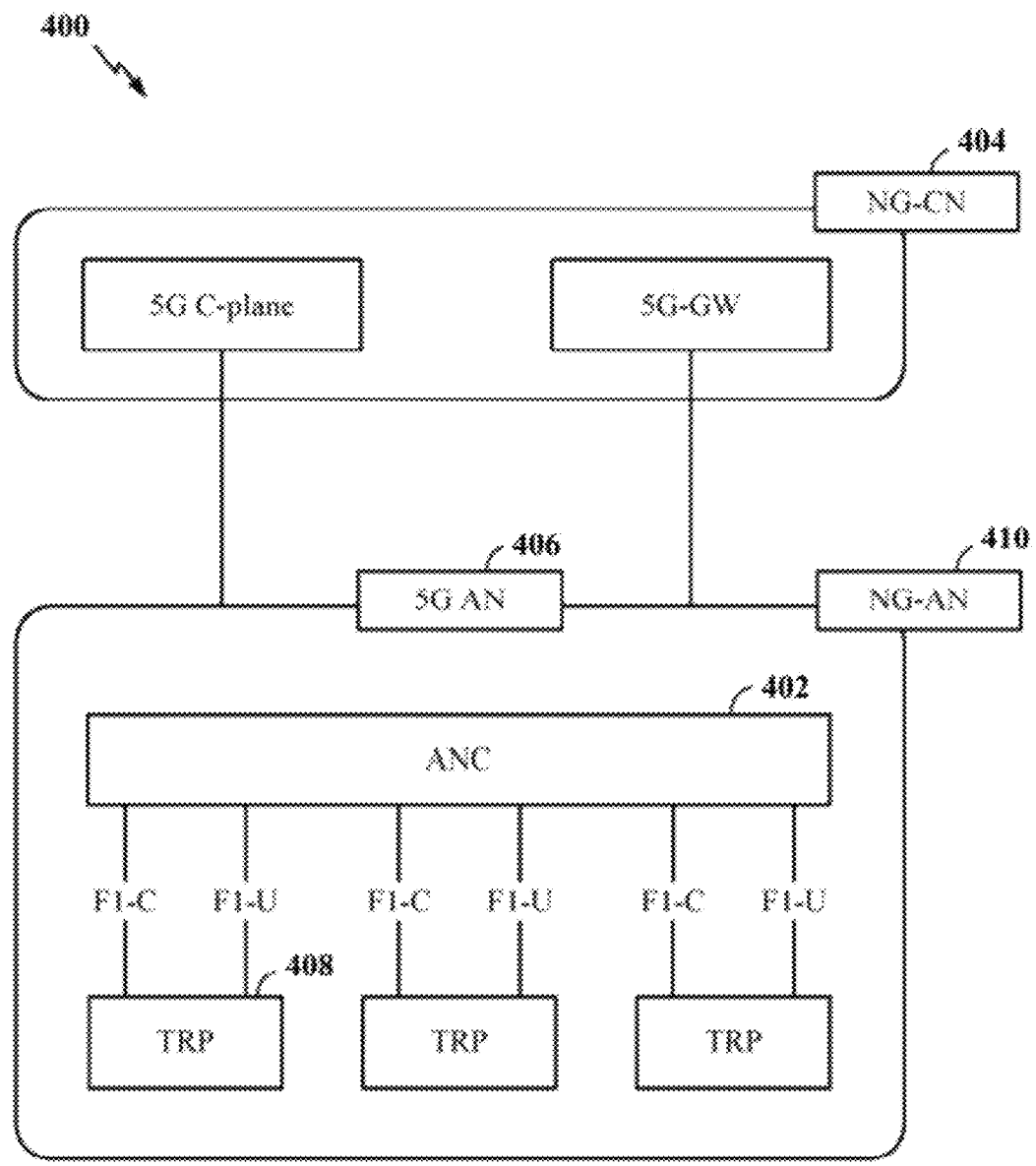
FIG. 4 illustrates an example logical architecture of a distributed access network.

FIG. 4 illustrates an example logical architecture 400 of a distributed RAN, according to aspects of the present disclosure. A 5G access node 406 may include an access node controller (ANC) 402. The ANC may be a central unit (CU) of the distributed RAN 400. The backhaul interface to the next generation core network (NG-CN) 404 may terminate at the ANC. The backhaul interface to neighboring next generation access nodes (NG-ANs) may terminate at the ANC. The ANC may include one or more TRPs 408 (which may also be referred to as BSs, NR BSs, Node Bs, 5G NBs, APs, or some other term). As described above, a TRP may be used interchangeably with "cell."

The respective TRPs 408 may be a distributed unit (DU). The TRPs may be coupled to one ANC (ANC 402) or more than one ANC (not illustrated). For example, for RAN sharing, radio as a service (RaaS), and service specific AND deployments, the TRP may be coupled to more than one ANC. A TRP may include one or more antenna ports. The TRPs may be configured to individually (e.g., dynamic selection) or jointly (e.g., joint transmission) serve traffic to a UE.

The local architecture of the distributed RAN 400 may be used to illustrate fronthaul definition. The architecture may be defined to support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 410 may support dual connectivity with NR. The NG-AN may share a common fronthaul for LTE and NR.

The architecture may enable cooperation between and among TRPs 408. For example, cooperation may be preset within a TRP and/or across TRPs via the ANC 402. According to aspects, no inter-TRP interface may be needed/present.

According to aspects, a dynamic configuration of split logical functions may be present within the architecture of the distributed RAN 400. The PDCP, RLC, MAC protocol may be adaptably placed at the ANC or TRP.

Figure 5:
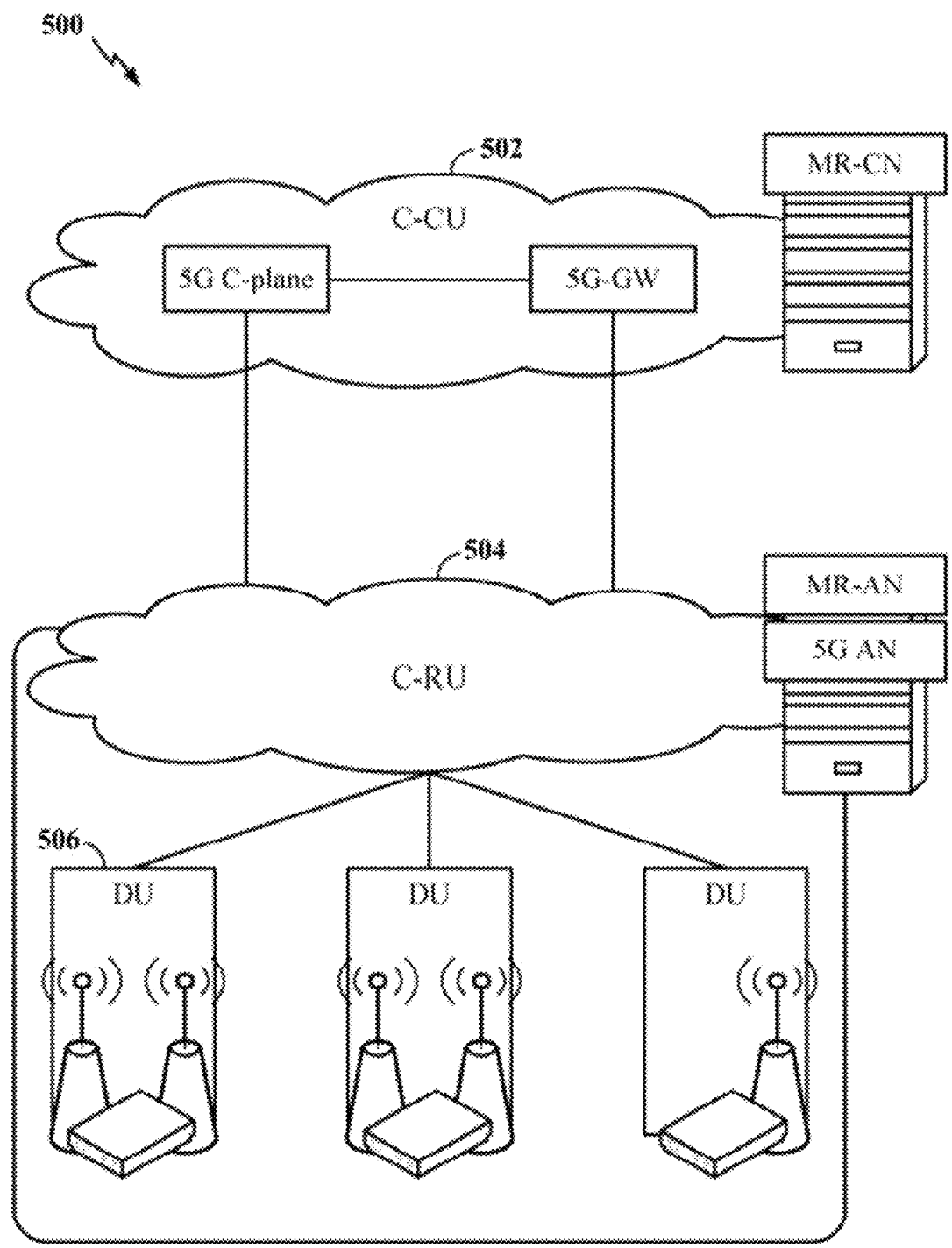
FIG. 5 illustrates an example physical architecture of a distributed access network.

FIG. 5 illustrates an example physical architecture of a distributed RAN 500, according to aspects of the present disclosure. A centralized core network unit (C-CU) 502 may host core network functions. The C-CU may be centrally deployed. C-CU functionality may be offloaded (e.g., to advanced wireless services (AWS)), in an effort to handle peak capacity. A centralized RAN unit (C-RU) 504 may host one or more ANC functions. Optionally, the C-RU may host core network functions locally. The C-RU may have distributed deployment. The C-RU may be closer to the network edge. A distributed unit (DU) 506 may host one or more TRPs. The DU may be located at edges of the network with radio frequency (RF) functionality.

Figure 6:
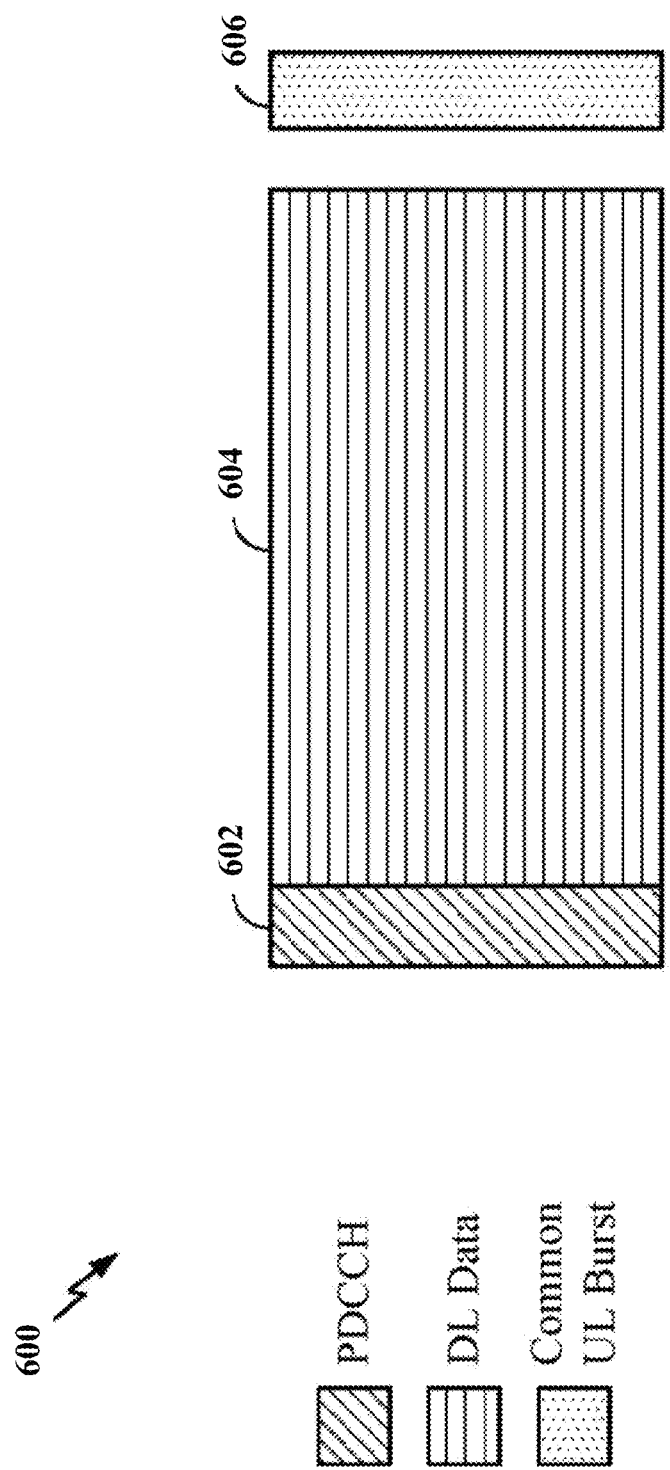
FIG. 6 is a diagram showing an example of a DL-centric subframe.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information.

As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
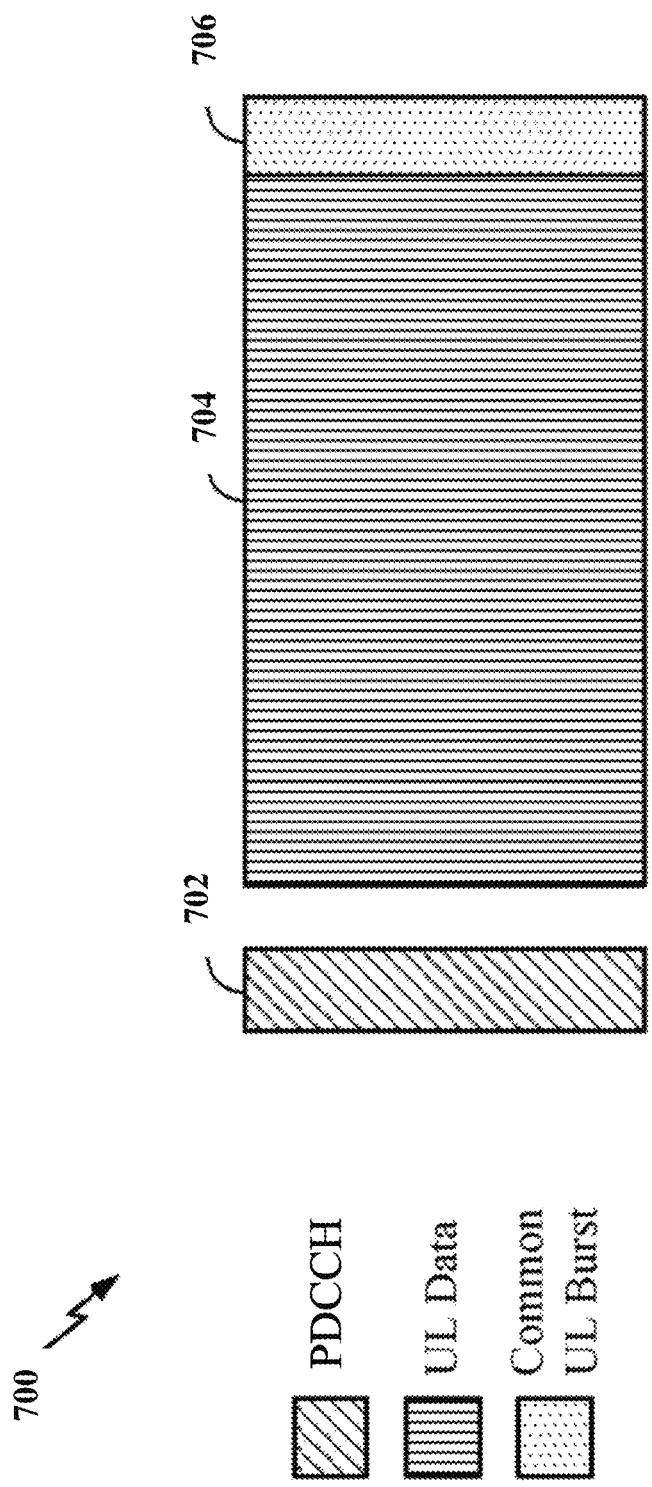
FIG. 7 is a diagram showing an example of an UL-centric subframe.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion 602 described above with reference to FIG. 6. The UL-centric subframe may also include an UL data portion 704. The UL data portion 704 may sometimes be referred to as the pay load of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Figure 8:
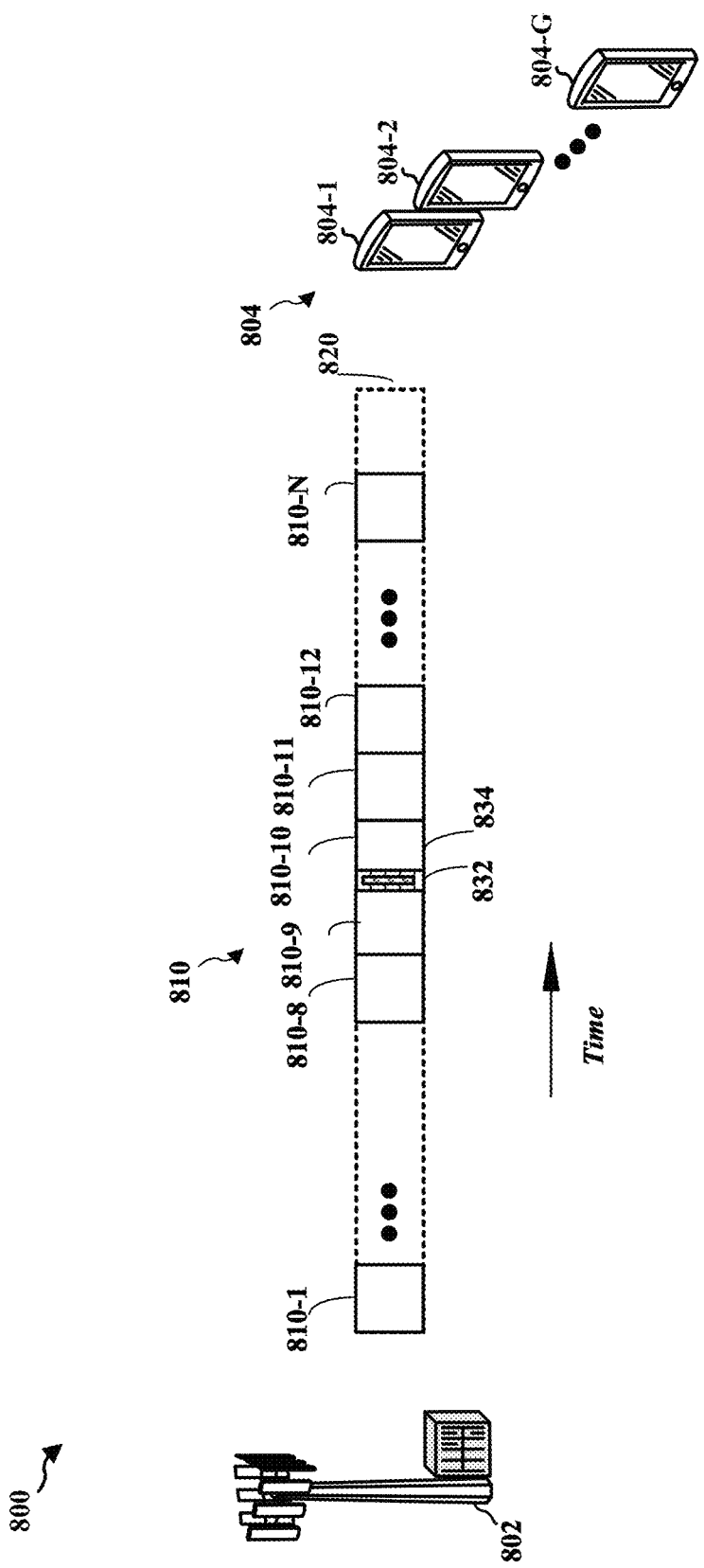
FIG. 8 is a diagram showing communications between a base station and a UE using cross-carrier scheduling.

FIG. 8 is a diagram illustrating a communication network 800 in which a base station 802 transmits a DL transmission to one or more UEs of a group that are in a cell of the base station 802, shown as UEs 804-1, 804-2, . . . 804-G, and referred to collectively or generally as UEs 804. "G" is the number of UEs 804 in the group, without limitation to a particular number G. The DL transmissions include symbols sent via one or more carriers 820. The symbols are provided in a plurality of slots 810-1, 810-2, . . . 810-N, referred to collectively or generally as slots 810. The base station 802 can send PDCCHs in each of the slots 810 to the UEs 804. The PDCCHs can include UE-specific PDCCHs directed to a particular UE, such as UE 804-1, and a group-common (GC)-PDCCH directed to all of the UEs 804-1, 804-2, . . . 804-G in the group. In the example shown, a GC-PDCCH is sent via the slot 810-10. Slot 810-10 includes a control region 832 and a data region 834. The GC-PDCCH is provided in the control region 832. The slots are transmitted over a frequency and time domain with the direction of time T indicated by an arrow. Accordingly, slots 810-8 and 810-9 (and an unlimited number of slots not shown) were sent before the slot 810-10, and slots 810-11 and 810-12 (and an unlimited number of slots not shown) are to be sent after the slot 810-10.

The base station 802 can provide common information in the GC-PDCCH. Examples of common information that can be included are a slot configuration for the slot 810-10 and/or one or more other slots that will be transmitted after slot 810-10 (e.g., slots 810-11, 810-12, . . . 810-N), a puncture configuration indicating one or more punctured symbols received in a slot 810 that was sent prior to slot 810-10 (e.g., slot 810-9), a transmission burst duration of a transmission on an unlicensed link in an unlicensed spectrum for a transmission to be transmitted after slot 810-10 (e.g., slots 810-11 and 810-12), and a resource allocation indication indicating one or more sub-regions of slot 810-10's control region 832 that are not allocated for PDCCH and can contain one or more symbols that are a part of PDSCH that is also transmitted in the data region 834.

The slot configuration can indicate whether the slot 810-10 and/or one or more of slots that will be transmitted after slot 810-10 (e.g., slots 810-10, 810-11, 810-12, . . . 810-N) will be used for UL transmissions or DL transmissions.

The slot configuration can further indicate when a slot that was originally designated to be used for a DL transmission to one of the UEs is now designated to be used for UL transmissions to another UE 804. When a UE learns from the slot configuration that it is not scheduled for a particular slot, that UE can refrain from decoding a UE-specific PDCCH for that slot, from conducting a radio resource management (RRM) measurement for that slot, and/or from conducting a channel state information (CSI) measurement for that slot, thus preserving resources of the unscheduled UEs.

In an example scenario, UE 804-1 was originally scheduled for receiving a DL transmission in slot 810-11 from the base station 802, but determined from a slot configuration included in common information provided in slot 810-10 that slot 810-11 is now designated for UL transmission from UE 804-2. UE 804-1 can decide to refrain from decoding the PDCCH in slot 810-11, and can further decide to refrain from conducting RRM measurement and/or CSI measurement for slot 810-11, as UE 804-1 does not transmit UL data in slot 810-11 and does not need to obtain control information from the control region of slot 810-11.

When dynamic TDD is available, similar to the flexibility provided with enhanced Interference Mitigation and Traffic Adaptation (eIMTA), the TDD pattern can be adapted dynamically, such as in response to varying capacity requirements in UL and DL. For example when using dynamic TDD, DL and UL subframe resources can be tailored in response to quick variations and burstiness of DL/UL traffic.

However, dynamic TDD can result in interference experienced by UL and DL transmissions in adjacent cells.

The slot configuration can further include a slot type that indicates whether a slot 810 is designated to operate as a semi-static or flexible slot. Semi-static slots (also referred to as fixed slots) are designated semi-statically for use as UL or DL slots. Flexible slots can change designations between UL and DL. Such semi-static slots may experience only light interference, and can behave differently than flexible slots that can experience heavy interference. For example, CSI measurement behavior and UL power behavior of a semi-static DL slot can be different when compared to a flexible DL slot.

Accordingly, UE 804-1 can decide to perform different types of CSI measurement for a DL slot 810-11 based on whether the slot type indicates that slot 810-11 is semi-static of flexible. Also, UE 804-1 can decide to perform different types of power control for an UL slot 810-11 based on whether the slot type indicates that slot 810-11 is semi-static of flexible.

Figure 9A:
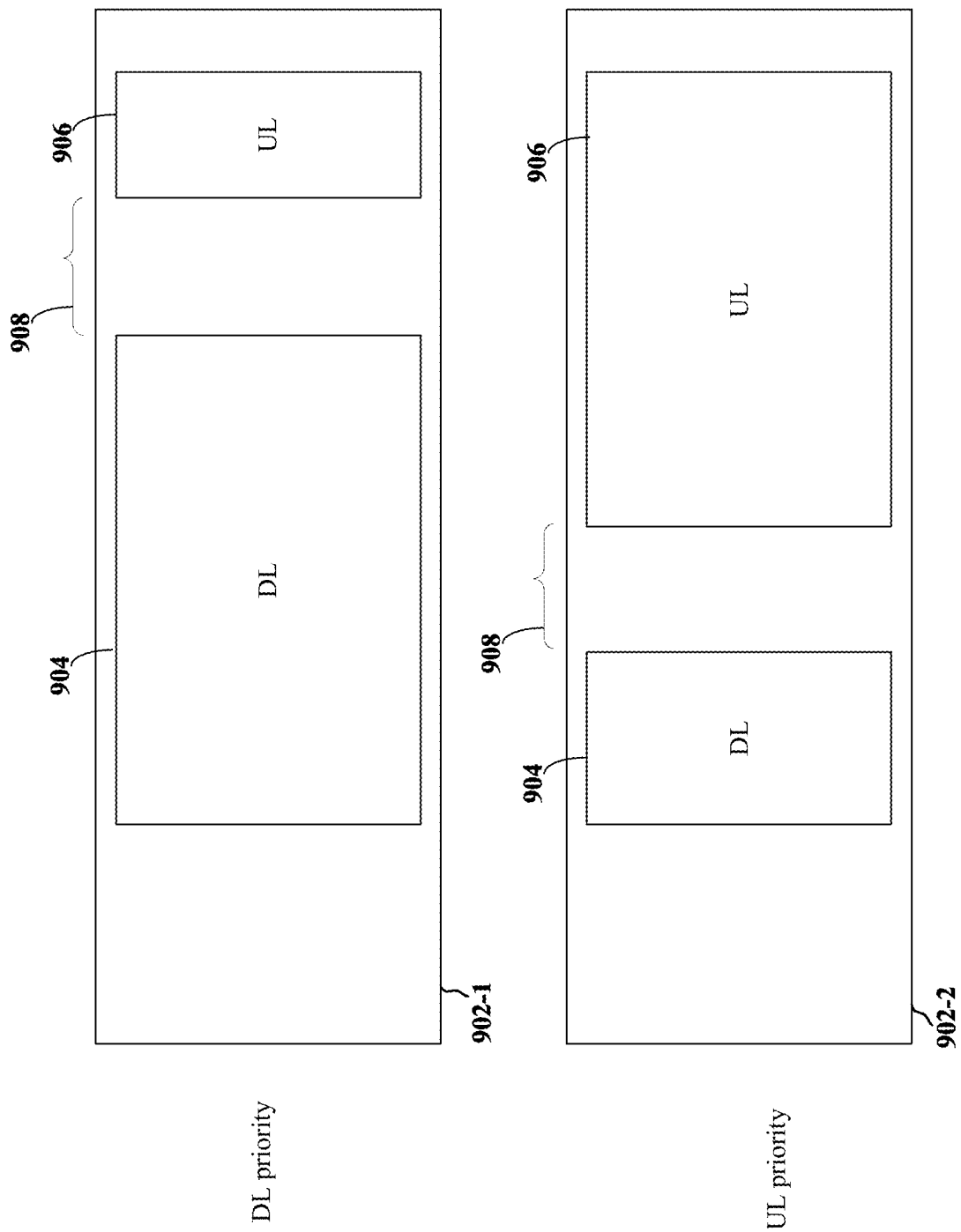
FIG. 9A is a diagram showing example slots having different slot sub-types.

FIG. 9A shows a diagram of example slots having different slot sub-types. The slot configuration can further indicate a slot sub-type, such as a UL priority bi-directional slot 902-1, or a DL priority bi-directional slot 902-2. When a slot includes both DL transmission portion 906 and UL transmission portion 904, a gap 908 is provided between the DL transmission portion 906 and UL transmission portion 904. A UL priority bi-directional slot subtype refers to the duration of the UL transmission portion 904 of the slot being longer than that of the DL transmission portion 906. A DL priority bi-directional slot subtype refers to the duration of the DL transmission portion 906 of the slot 810 being longer than that of the UL transmission portion 904. The sub-type affects the location of the gap 908. In certain configurations, the base station and the UEs may implement clear channel assessment (CCA). A busy tone under CCA may be inserted at different locations for the UL priority bi-directional slot 902-1 and the DL priority bi-directional slot 902-2. As such, knowledge about the sub-type can help the UE correctly perform CCA.

A UE can use the sub-type designation to derive the timing of a detection period during which an energy detection of the CCA is performed. The detection period is also designated for transmission of a busy tone by the base station 802 or a UE.

Thus, the UE can also use the sub-type designation to determine the timing of a detection period, when to conduct transmission of a busy tone, and whether to conduct transmission of a busy tone in the detection period.

A UE can further use the sub-type designation to select an energy detection threshold for CCA, wherein the energy detection threshold can also be used for performing listen-before-talk (LBT) when using an unlicensed channel in an unlicensed spectrum. In addition, the UEs can use the sub-type designation to control power when a slot is used for UL transmission.

The slot configuration can further indicate a gap period between the control region and the data region of a slot 810. For example, to support dynamic TDD (especially in unlicensed spectrum), a gap period can be provided from the point of view of a UE for CCA, such that channel sensing can be performed and/or a busy tone signal can be inserted by base station or UE in the gap period. In certain configurations, the GC-PDCCH may contain the gap period information of a particular UE (e.g., UE 804-1). As such, other UEs (e.g., UEs 804-2 and 804-3) can use the gap period to avoid erroneous adjustment of automatic gain control (AGC) according to transmission (e.g., busy tone) in the gap period.

The common information can further include a transmission burst duration that indicates the duration of a transmission burst acquired by the base station 802. The transmission burst is a transmission on a link in an unlicensed spectrum. The transmission burst duration can facilitate proper LBT performance by the UEs 804 and increase efficiency. For example, LBT schemes can be categorized as follows.

Category 1: No LBT
Category 2: LBT without random back-off
Category 3: LBT with random back-off with fixed size of contention window
Category 4: LBT with random back-off with variable size of contention window Using the transmission burst duration, a UE can, for example, convert a category 4 LBT into a category 2 LBT if it is transmitted together with the transmission burst acquired by the base station 802.

When the UE receives the transmission burst duration via the common information, the UE can detect a start of a DL transmission on the unlicensed link. The UE can determine that a particular time slot is within the transmission burst based on the time burst duration, and demodulate symbols received in the particular time slot.

In an example, knowing the start and duration of a transmission burst based on a transmission burst duration provided in the GC PDCCH, UE 804-1 can select a time point within the transmission burst, perform an LBT operation at the time point selected without random backoff, and transmit data in a UL on the unlicensed link when the unlicensed link is determined to be clear by the LBT operation.

Further, the common information can also include puncture configuration to indicate the presence and location of puncture information in a previous slot. For example, puncture configuration included in the common information of a GC-PDCCH received by the UEs at slot 810-10 can indicate the presence and location of puncture information in slot 810-9.

Figure 9B:
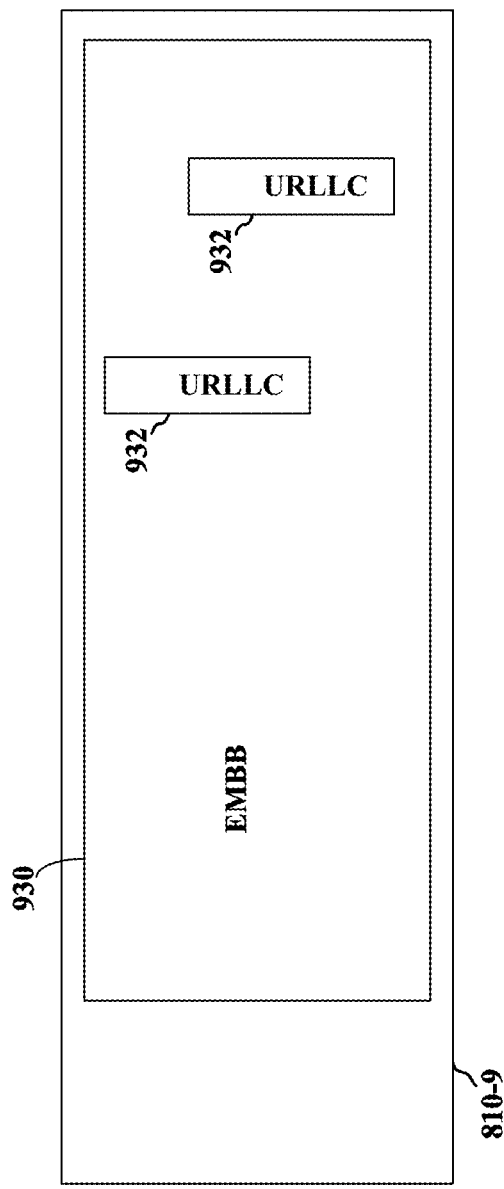
FIG. 9B is a diagram showing an example slot that includes eMBB and puncture information.

FIG. 9B shows a diagram of an example slot 810-9 that includes eMBB data 930 for UEs 804-1, 804-2, and/or 804-3, and further includes URLLC data 932 for 804-2 that punctures the eMBB data 930. Upon receiving the URLLC data 932, the UE for which it is intended, namely UE 804-2, can decode the URLLC data 932. However, UEs 804-1 and 804-3 were not aware of the URLLC data 932 when it was received and may have failed to decode the punctured eMBB data 930 due to missing data of the eMBB data 930 caused by the puncture.

Once UEs 804-1, 804-2, and 804-3 receive the puncture information in the common information provided in the GC-PDCCH when processing the slot 810-10, the UEs 804-1 and 804-3 first become aware that the previous slot 810-9 was punctured by the URLLC data 932. If the eMBB data 930 was not successfully decoded, UEs 804-1 and 804-3 can attempt a second time to decode the eMBB data 930 by skipping the resources of slot 810-9 that are occupied by URLLC data 932. In this manner, UEs 804-1 and 804-3 may correctly decode eMBB data 930. Alternatively, upon receiving the puncture information, if the eMBB data 930 was not successfully decoded, the UEs 804-1 and 804-3 can send a negative acknowledgement to the base station 802, such as a NACK according to HARQ-ACK/NACK feedback timing. As such, the UEs 804-1 and 804-3 requests the base station 802 to re-transmit the eMBB data 930 in the slot 810-9. When the base station 802 re-transmits the eMBB data 930 without being punctured by the URLLC data 932, the UEs 804-1 and 804-3 may successfully decode the eMBB data 930.

The common information can further include a resource allocation indication that indicates resource allocation for the group-control slot 810-10 and/or any slot 810 that includes GC PDCCH or UE-specific PDCCH. The resource allocation indicates which resources are used by PDCCH. Based on the resource allocation indication, the UEs can determine which resources are unused. The base station 802 can be configured to use unused resources for transmission of PDSCH, but only using those unused resources that are restricted to the same frequency as PDSCH transmitted in a corresponding data region.

Figure 9C:
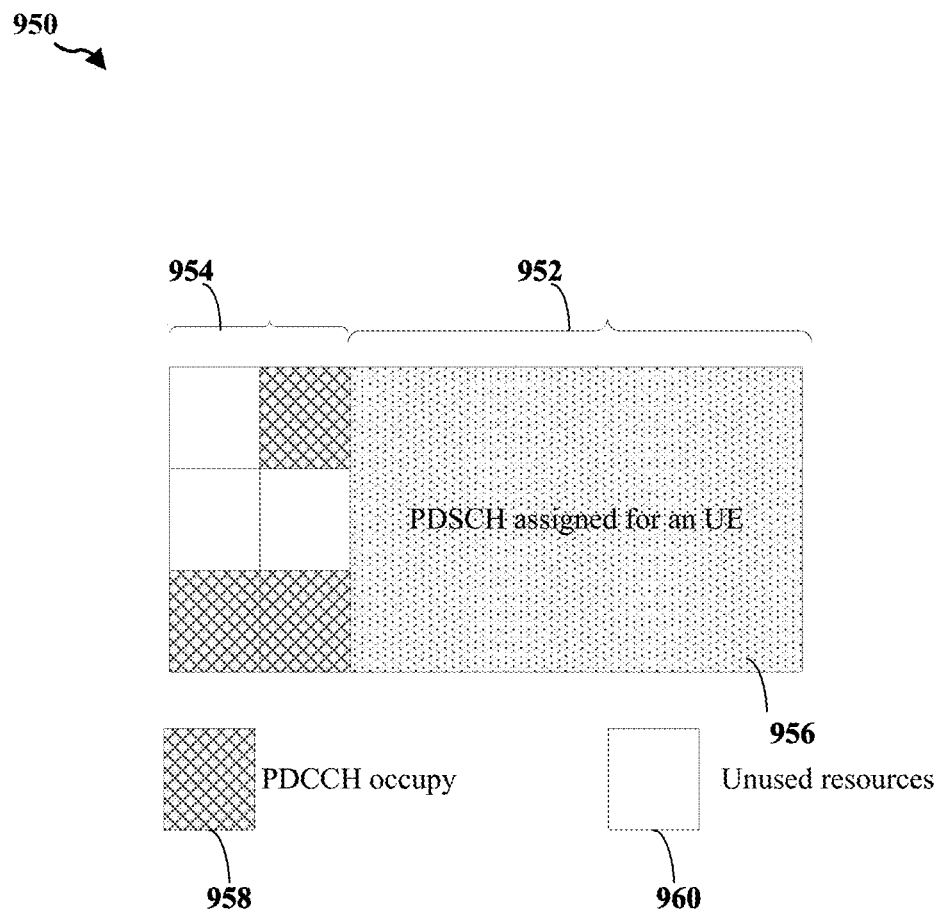
FIG. 9C is a diagram showing an example slot having a control region that includes PDCCH and unused resources that are available to be used for PDSCH.

FIG. 9C shows a diagram of an example slot 950 having a control region 954 that includes PDCCH and unused resources that are available to be used for PDSCH 956. The slot 950 can be the group-control slot 810-10 or any other slot that includes PDCCH. Slot 950 includes a data region 952 and the control region 954. The data region 952 includes PDSCH 956 that is assigned to one of the UEs 804-1, 802-2, . . . 802-G. The control region 954 includes PDCCH 958 and unused resources 960. The resource allocation indication received by the UEs inform the UEs which resources in the control region 954 are occupied by PDCCH 958. Based on this knowledge of the resources that are already allocated for occupation by PDCCH 958, the UEs can determine which resources are unused and available to be used for data transmission. Each UE can be configured to determine whether the unused resources 960 that use the same frequency as PDSCH in a corresponding data region were used for data transmission for that UE. The UE can thus perform correct de-rate matching without the need for performing blind detections to determine the presence of data for that UE in the unused resources 960.

A fallback mechanism is provided for conditions in which a UE is configured to support group-common PDCCH, but did not receive a group-common PDCCH. For example, UE 804-1 did not successfully detect the group-common PDCCH in group-control slot 810-10. The group-common PDCCH that was unsuccessfully detected may have indicated that a slot configuration was changed or that URLLC data was present in a previous slot when a puncture did in fact occur.

Without access to the information in the unsuccessfully detected group-common PDCCH, UE 804-1 does not assume that the configuration of slots received following the unsuccessfully detected group-common PDCCH are unchanged. Thus, UE 804-1 does not know the slot type of each slot 810. Thus, UE 804-1 monitors PDCCH for each slot 810 to determine the slot type.

Furthermore, when eMBB data are unsuccessfully decoded, UE 804-1 should not assume the existence of URLLC data. Rather, UE 804-1 may consider different possibilities for the unsuccessful decoding of the eMBB data, such as noise, interference, puncture by URLLC data, etc.

A second fallback mechanism is needed for conditions in which a UE, such as UE 804-1 is not configured to detect or decode a GC-PDCCH. UE 804-1 determines whether slot configurations are being provided from higher layers. If there are no slot configurations provided from higher layers, UE 804-1 monitors PDCCH in each slot 810, including DL and UL slots.

If there are slot configurations provided from higher layers, then UE 804-1 uses those slot configurations from the higher layers to determine which slots are UL slots and which slots are DL slots. UE 804-1 can also monitor UE specific PDCCH in each slot to determine slot type, etc.

Additionally, when UE 804-1 is not configured to detect or decode a GC-PDCCH, UE 804-1 is not able to perform PDCCH resource sharing using a resource allocation indication provided in a GC-PDCCH as described above. Rather, UE 804-1 determines whether resources are being shared using techniques that do not rely on GC-PDCCH. Additionally, since puncture information is not available for URLLC data directed to another UE, such as UE 804-2 or 804-3, UE 804-1 assumes that eMBB data is not punctured by URLLC data. In this case, UE 804-1 may need to consider different possibilities for the unsuccessful decoding of the eMBB, such as noise, interference, puncture by URLLC data, etc.

Figure 10A:
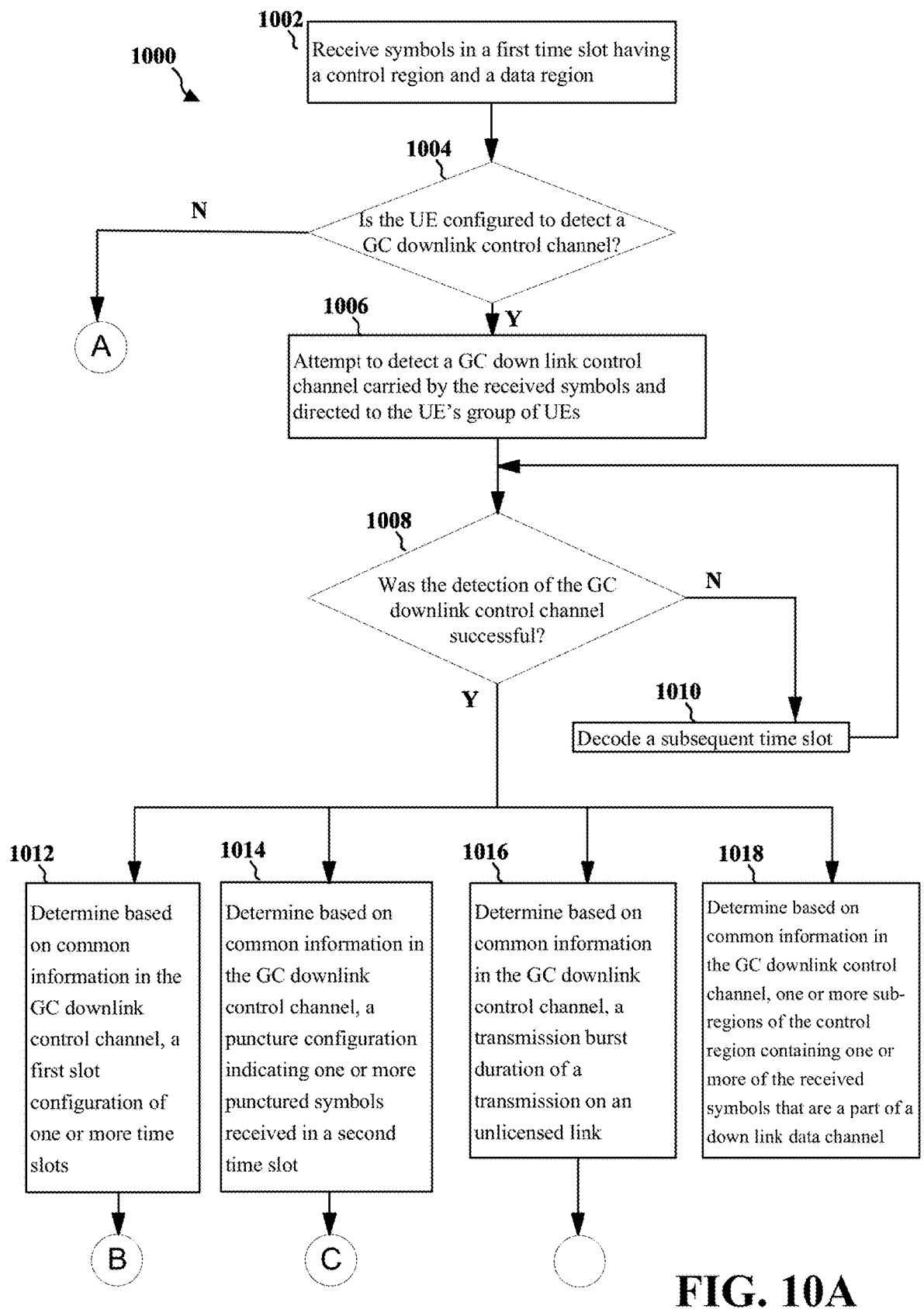
FIGS. 10A-10C are a flowchart of a method (process) for processing group-common PDCCH by a UE.
Figure 10B:
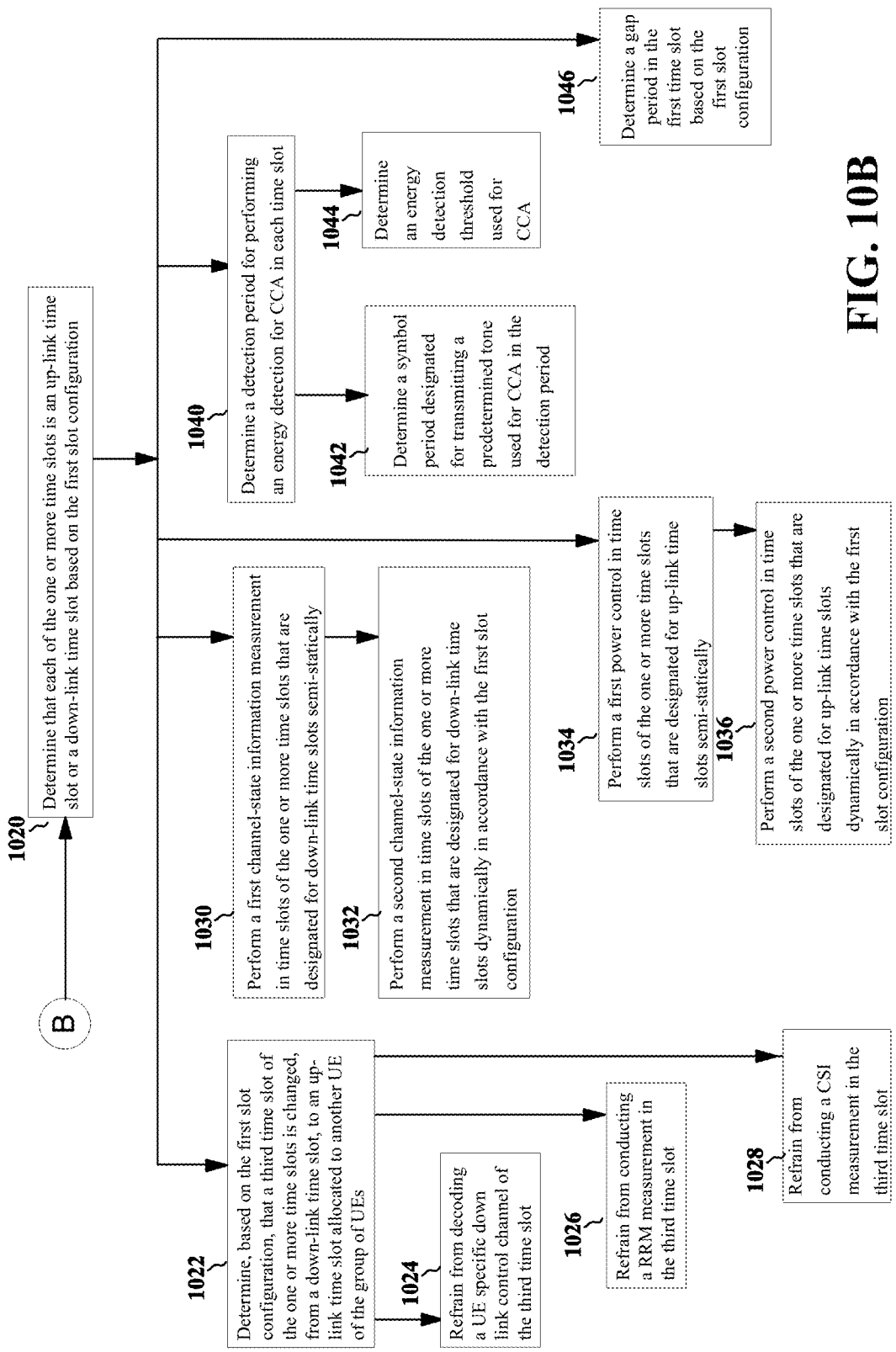
Figure 10C:
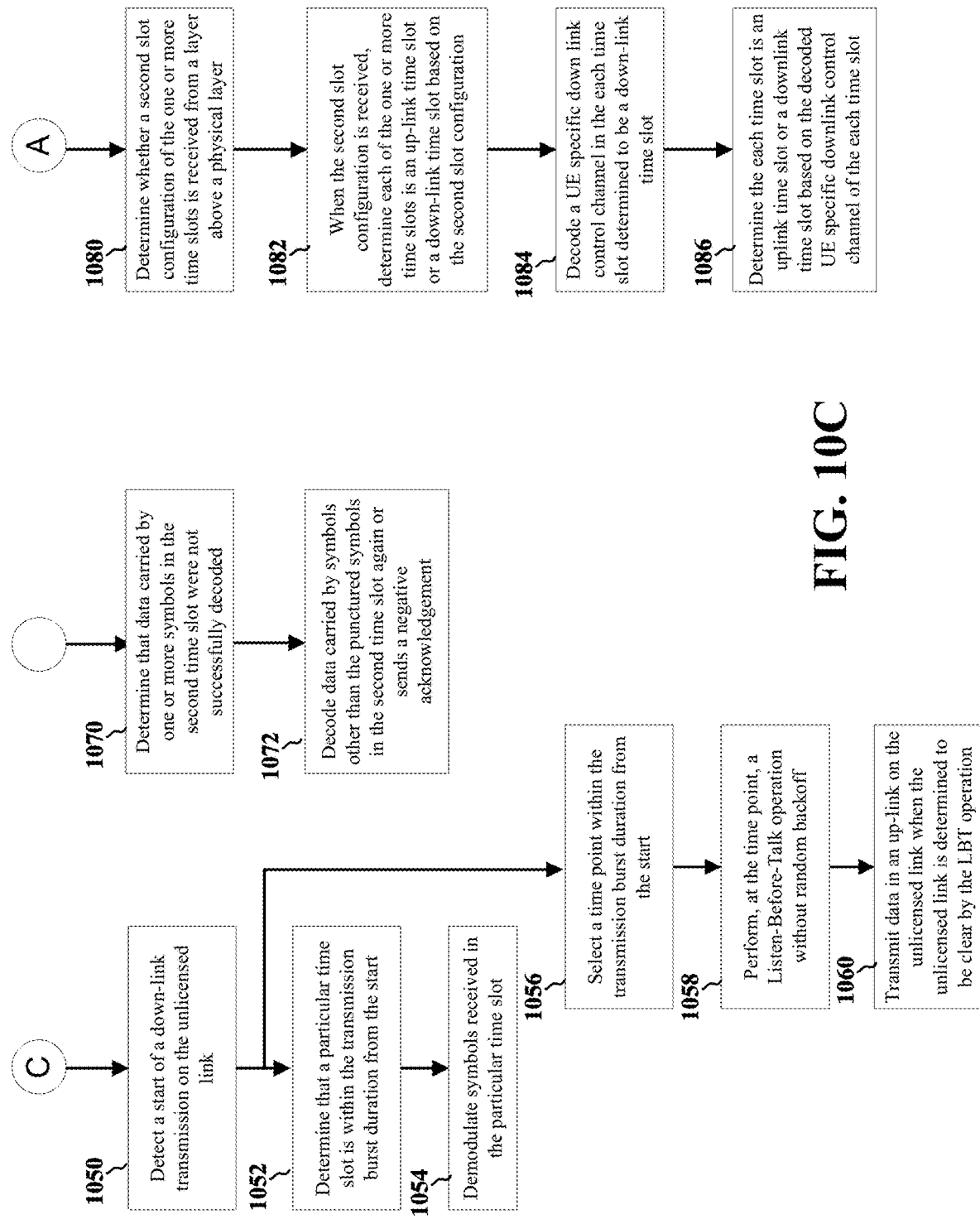

FIGS. 10A-10C are a flowchart 1000 of a method (process) of wireless communication of a UE. The method is performed by a UE, such as UE 804-1 of a group of UEs 804-1, 804-2, . . . 804-G, apparatus 1102, and apparatus 1102'. As shown in FIG. 10A, at operation 1002, UE 804-1 receives symbols in a first time slot having a control region and a data region. At operation 1004, UE 804-1 determines whether it is configured to detect a GC downlink control channel. If UE 804-1 determines that it is not configured to detect a GC downlink control channel, then the method continues at operation 1080 shown in FIG. 10C. If UE 804-1 determines that it is configured to detect a GC downlink control channel, then the method continues at operation 1006 shown in FIG. 10A.

At operation 1006 UE 804-1 attempts to detect a GC down link control channel carried by the received symbols and directed to UE 804-1's group of UEs. At operation 1008, UE 804-1 determines whether the detection of the GC downlink control channel was successful.

If UE 804-1 determines that the detection was not successful, then the method continues at operation 1010. At operation 1010 UE 804-1 iteratively decodes a UE specific down link control channel in each of the first time slot and subsequent time slots, after which the determination at operation 1008 is performed again to determine whether the detection of the GC down link control channel was successful, forming a logical loop. This loop can continue until the 804-1 successfully detects a GC down link control channel in a time slot.

Once UE 804-1 determines that the detection was successful, then the method continues with UE 804-1 performing at least one of operations 1012 followed by operation 1020 (shown in FIG. 10B), operation 1014 followed by operation 1050 (shown in FIG. 10C), 1016 followed by operation 1070 (shown in FIG. 10C), and operation 1018.

At operation 1012, UE 804-1 determines, based on common information in the GC downlink control channel, a first slot configuration of one or more time slots. Next, at operation 1020 (of FIG. 10B), UE 804-1 determines that each of the one or more time slots is an up-link time slot or a down-link time slot based on the first slot configuration. Next, the method continues at one or more of operations 1022, 1030, 1034, 1040, and 1046 of FIG. 10B. In other words, UE 804-1 can perform one or more of these operations.

At operation 1022, UE 804-1 determines based on the first slot configuration, that a third time slot of the one or more time slots is changed from a down-link time slot to an up-link time slot allocated to another UE of the group of UEs. Next, the method continues at one or more of operations 1024, 1026, and 1028. At operation 1024, UE 804-1 refrains from decoding a UE specific down link control channel of the third time slot. At operation 1026, UE 804-1 refrains from conducting a RRM measurement in the third time slot. At operation 1028, UE 804-1 refrains from conducting a CSI measurement in the third time slot.

At operation 1030 (FIG. 10B) (following operation 1012 of FIG. 10A), UE 804-1 performs a first channel-state information measurement in time slots of the one or more time slots that are designated for down-link time slots semi-statically. At operation 1032, UE 804-1 performs a second channel-state information measurement in time slots of the one or more time slots that are designated for down-link time slots dynamically in accordance with the first slot configuration.

At operation 1034, UE 804-1 performs a first power control in time slots of the one or more time slots that are designated for up-link time slots semi-statically. At operation 1036, UE 804-1 performs a second power control in time slots of the one or more time slots that are designated for up-link time slots dynamically in accordance with the first slot configuration.

At operation 1040, the first slot configuration can indicate whether the time slot is an up-link time slot, a down-link time slot, an up-link priority bi-directional time slot, or a down-link priority bi-directional time slot. UE 804-1 can further determine, based on whether the time slot is an up-link time slot, a down-link time slot, an up-link priority bi-directional time slot, or a down-link priority bi-directional time slot, a detection period for performing an energy detection for CCA in each time slot. Next, the method continues at one or more of operations 1042 and 1044. At operation 1042, UE 804-1 determines a symbol period designated for transmitting a predetermined tone used for CCA in the detection period based on whether the time slot is an up-link time slot, a down-link time slot, an up-link priority bi-directional time slot, or a down-link priority bi-directional time slot. At operation 1044, the UE-804-1 determines an energy detection threshold used for CCA whether the time slot is an up-link time slot, a down-link time slot, an up-link priority bi-directional time slot, or a down-link priority bi-directional time slot.

At operation 1046 (see FIG. 10B), UE 804-1 determines a gap period in the first time slot based on the first slot configuration.

At operation 1014 (of FIG. 10A), UE 804-1 determines based on common information in the GC downlink control channel, a puncture configuration indicating one or more punctured symbols received in a second time slot. Next, at operation 1050 (of FIG. 10C), UE 804-1 detects a start of a down-link transmission on the unlicensed link.

The method can continue at operation 1052 or at operation 1056. At operation 1052, UE 804-1 determines that a particular time slot is within the transmission burst duration from the start. At operation 1054, UE 804-1 demodulates symbols received in the particular time slot. At operation 1056, UE 804-1 selects a time point within the transmission burst duration from the start. At operation 1058, UE 804-1 performs, at the time point, an LBT operation without random backoff. At operation 1060, UE 804-1 transmits data in an up-link on the unlicensed link when the unlicensed link is determined to be clear by the LBT operation.

At operation 1016 (of FIG. 10A), UE 804-1 determines based on common information in the GC downlink control channel, a transmission burst duration of a transmission on an unlicensed link. Next, at operation 1070 (of FIG. 10C), UE 804-1 determines that data carried by one or more symbols in the second time slot were not successfully decoded. At operation 1072, UE 804-1 decodes data carried by symbols other than the punctured symbols in the second time slot again or sends a negative acknowledgement.

At operation 1018, UE 804-1 determines based on common information in the GC downlink control channel, one or more sub-regions of the control region containing one or more of the received symbols that are a part of a down link data channel.

At operation 1080 (of FIG. 10C), which is performed when it is determined that UE 804-1 is not configured to detect a GC downlink control channel, UE 804-1 determines whether a second slot configuration of the one or more time slots is received from a layer above a physical layer. When the second slot configuration is received, at operation 1082 UE 804-1 determines each of the one or more time slots is an up-link time slot or a down-link time slot based on the second slot configuration. At operation 1084, UE 804-1 decodes a UE specific down link control channel in the each time slot determined to be a down-link time slot. At operation 1086, UE 804-1 determines the each time slot is an uplink time slot or a downlink time slot based on the decoded UE specific downlink control channel of the each time slot. This decoding operation can be performed, regardless of whether the time slot is a DL or UL time slot.

Figure 11:
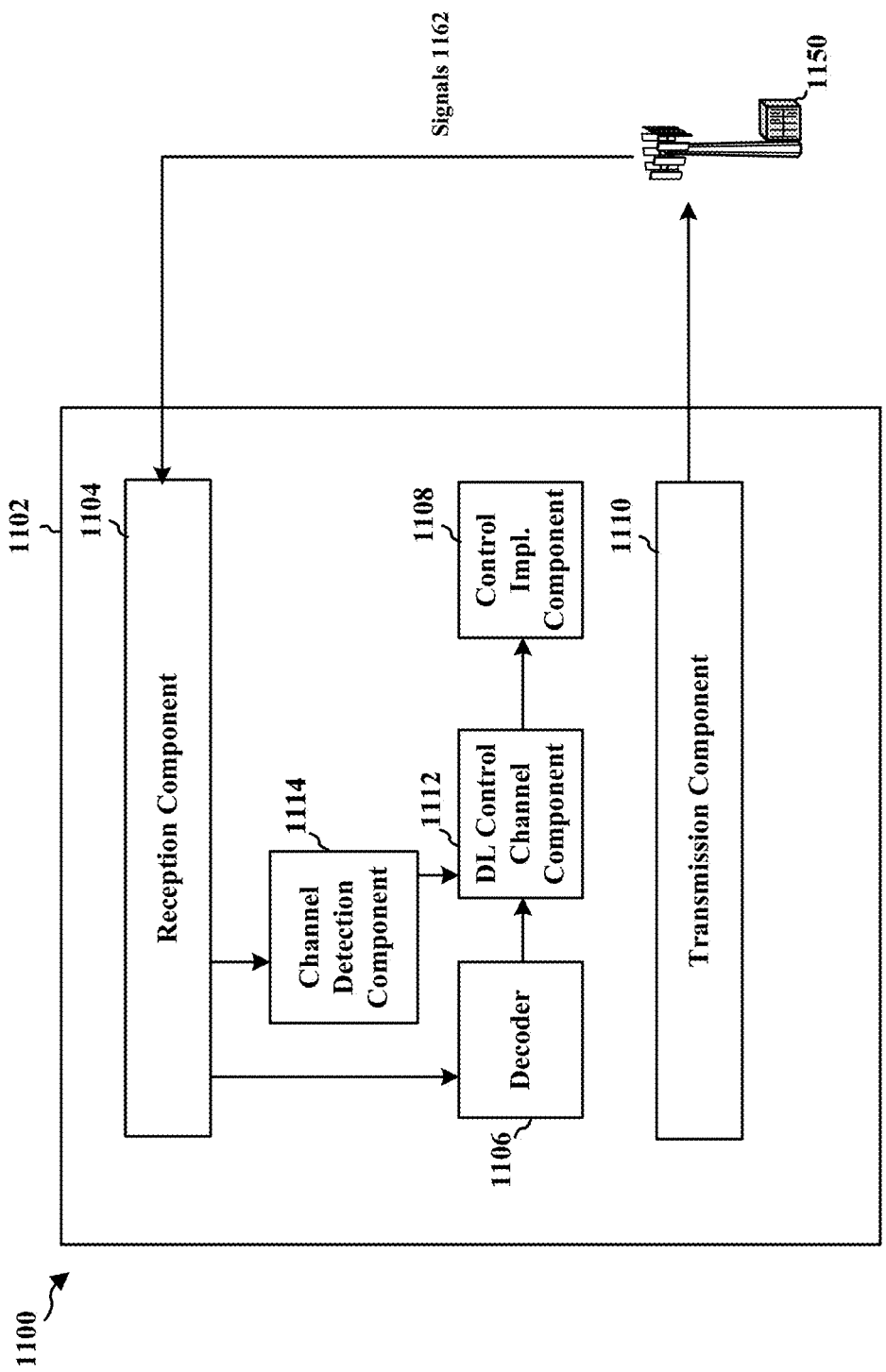
FIG. 11 is a conceptual data flow diagram illustrating the data flow between different components/means in an exemplary apparatus.

FIG. 11 is a conceptual data flow diagram 1100 illustrating the data flow between different components/means in an exemplary apparatus 1102. The apparatus 1102 may be a UE of a group of UEs. The apparatus 1102 includes a reception component 1104, a decoder 1106, a control implementation component 1108, a transmission component 1110, a DL control channel component (GC and UE specific) 1112, and a channel detection component 1114. The reception component 1104 may receive transmission signals 1162 including symbols in a first time slot having a control region and a data region.

In one aspect, when configured for detection of a GC DL control channel, the GC channel detection component 1114 attempts to detect a GC DL control channel carried by the received symbols and directed to the UE's group of UEs. The GC DL control channel contains common information directed to the group of UEs. Once the attempted detection by the GC channel detection component 1114 is successful, the DL control channel component 1112 determines based on the common information at least one of a first slot configuration of one or more time slots, a puncture configuration indicating one or more punctured symbols received in a second time slot, a transmission burst duration of a transmission on an unlicensed link, and one or more sub-regions of the control region containing one or more of the received symbols that are a part of a down link data channel.

In certain configurations, when the GC channel detection component 1114 is not configured to detect a GC DL control channel, the DL control channel component 1112 determines whether a second slot configuration of the one or more time slots is received from a layer above a physical layer. When the second slot configuration is received, the DL control channel component determines each of the one or more time slots is an up-link time slot or a down-link time slot based on the second slot configuration and the decoder 1106 decodes a UE specific down link control channel in the each time slot determined to be a down-link time slot.

In certain configurations, when the second slot configuration is received, the decoder 1106 decodes a UE specific down link control channel in the each time slot. This decoding operation can be performed, regardless of whether the time slot is a DL or UL time slot. The DL control channel component 1112 determines the each time slot is an uplink time slot or a downlink time slot based on the decoded UE specific downlink control channel of the each time slot.

In certain configurations, when the attempted downlink control channel was not detected successfully, the GC channel detection component 1114 continues to attempting to detect a group common down link control channel in a subsequent time slot until detection is successful.

In certain configurations, when the DL control channel component 1112 determines, based on the common information, a first slot configuration of one or more time slots, the DL control channel component 1112 determines that each of the one or more time slots is an up-link time slot or a down-link time slot based on the first slot configuration.

Next, in certain configurations, based on the first slot configuration, the DL control channel component 1112 can determine that a third time slot of the one or more time slots is changed from a down-link time slot to an up-link time slot allocated to another UE of the group of UEs. Based on the determination that the third time slot is changed to an up-link time slot, the decoder 1106 can refrain from decoding a UE specific down link control channel of the third time slot, the control implementation component 1108 can control the UE to refrain from conducting an RRM measurement in the third time slot, and/or the control implementation component 1108 can control the UE to refrain from conducting a CSI measurement in the third time slot.

In certain configurations, based on the first slot configuration, the control implementation component 1108 can control the UE to perform a first channel-state information measurement in time slots of the one or more time slots that are designated for down-link time slots semi-statically, and a second channel-state information measurement in time slots of the one or more time slots that are designated for down-link time slots dynamically in accordance with the first slot configuration.

In certain configurations, based on the first slot configuration, the control implementation component 1108 can control the UE to perform a first power control in time slots of the one or more time slots that are designated for up-link time slots semi-statically, and a second power control in time slots of the one or more time slots that are designated for up-link time slots dynamically in accordance with the first slot configuration.

In certain configurations, the first slot configuration indicates whether the corresponding time slot is an up-link time slot, a down-link time slot, an up-link priority bi-directional time slot, or a down-link priority bi-directional time slot. The DL control channel component 1112 can determine a detection period for performing an energy detection for CCA in each time slot based on whether the time slot is an up-link time slot, a down-link time slot, an up-link priority bi-directional time slot, or a down-link priority bi-directional time slot. Additionally, in certain configurations, based on whether the time slot is an up-link time slot, a down-link time slot, an up-link priority bi-directional time slot, or a down-link priority bi-directional time slot, the DL control channel component 1112 can determine a symbol period designated for transmitting a predetermined tone used for CCA in the detection period. Additionally or alternatively, the DL control channel component 1112 can determine an energy detection threshold used for CCA based on whether the time slot is an up-link time slot, a down-link time slot, an up-link priority bi-directional time slot, or a down-link priority bi-directional time slot.

In certain configurations, based on the first slot configuration, the DL control channel component 1112 determines a gap period in the first time slot.

In certain configurations, the DL control channel component 1112 determines, based on the common information, a puncture configuration indicating one or more punctured symbols received in a second time slot. The channel detection component 1114 detects a start of a down-link transmission on the unlicensed link. The DL control channel component 1112 determines that a particular time slot is within the transmission burst duration from the start. The demodulator component 1124 demodulates symbols received in the particular time slot.

In certain configurations, when the DL control channel component 1112 determines, based on the common information, a transmission burst duration of a transmission on an unlicensed link. The DL control channel component 1112 selects a time point within the transmission burst duration from the start of a down-link transmission on the unlicensed link. The transmission component 1110 performs an LBT operation without random backoff at the time point. The transmission component 1110 transmits data in an up-link on the unlicensed link when the unlicensed link is determined to be clear by the LBT operation.

In certain configurations, when the DL control channel component 1112 determines, based on the common information, a puncture configuration indicating one or more punctured symbols received in a second time slot, the DL control channel component 1112 determines that data carried by one or more symbols in the second time slot were not successfully decoded. The decoder 1106 decodes data carried by symbols other than the punctured symbols in the second time slot again or sends a negative acknowledgement.

Figure 12:
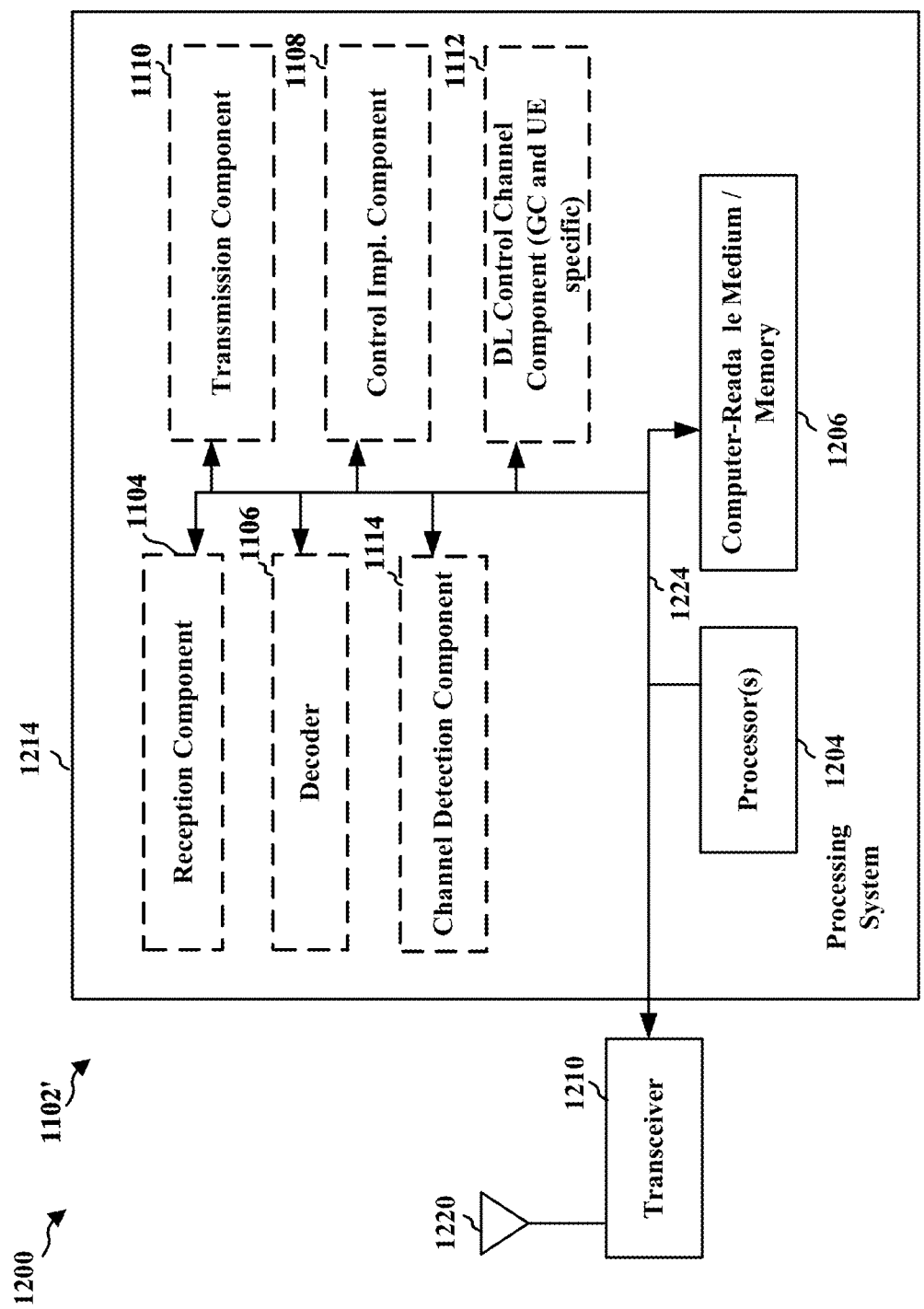
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by a bus 1224. The bus 1224 may include any number of interconnecting buses and bridges depending on the specific application of the processing system 1214 and the overall design constraints. The bus 1224 links together various circuits including one or more processors and/or hardware components, represented by one or more processors 1204, the reception component 1104, the decoder 1106, the control implementation component 1108, the transmission component 1110, the DL control channel component (GC and UE specific) 1112, the channel detection component 1114, and a computer-readable medium/memory 1206. The bus 1224 may also link various other circuits such as timing sources, peripherals, voltage regulators, and power management circuits, etc.

The processing system 1214 may be coupled to a transceiver 1210, which may be one or more of the transceivers 354. The transceiver 1210 is coupled to one or more antennas 1220, which may be the communication antennas 352.

The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1110, and based on the received information, generates a signal to be applied to the one or more antennas 1220.

The processing system 1214 includes one or more processors 1204 coupled to a computer-readable medium/memory 1206. The one or more processors 1204 are responsible for general processing, including the execution of software stored on the computer-readable medium/memory 1206. The software, when executed by the one or more processors 1204, causes the processing system 1214 to perform the various functions described supra for any particular apparatus. The computer-readable medium/memory 1206 may also be used for storing data that is manipulated by the one or more processors 1204 when executing software. The processing system 1214 further includes at least one of the reception component 1104, the decoder 1106, the control implementation component 1108, the transmission component 1110, the DL control channel component 1112, and the channel detection component 1114. The components may be software components running in the one or more processors 1204, resident/stored in the computer readable medium/memory 1206, one or more hardware components coupled to the one or more processors 1204, or some combination thereof. The processing system 1214 may be a component of the UE 350 and may include the memory 360 and/or at least one of the TX processor 368, the RX processor 356, and the communication processor 359.

In one configuration, the apparatus 1102/apparatus 1102' for wireless communication includes means for performing each of the operations of FIGS. 10A-10C. The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 368, the RX Processor 356, and the communication processor 359. As such, in one configuration, the aforementioned means may be the TX Processor 368, the RX Processor 356, and the communication processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
   receiving symbols in a first time slot, the first time slot including a control region and a data region;
   attempting to detect, when the UE is configured to detect, a group common downlink control channel carried by the received symbols, the group common downlink control channel containing common information directed to a group of UEs including the UE; and
   when the detection is successful, determining, based on the common information, at least one of
      (a) a first slot configuration of one or more time slots,
      (b) a puncture configuration indicating one or more punctured symbols received in a second time slot, the one or more punctured symbols being initially allocated for carrying enhanced Mobile Broadband (eMBB) data and carrying Ultra-Reliable and Low Latency Communications (URLLC) data, the second time slot being prior to the first time slot,
      (c) a transmission burst duration of a transmission on an unlicensed link, the unlicensed link being in an unlicensed spectrum, and
      (d) one or more sub-regions of the control region containing one or more of the received symbols that are a part of a downlink data channel, the downlink data channel including one or more of the received symbols in the data region;
   wherein the first slot configuration is determined based on the common information, the method further comprising: determining that each of the one or more time slots is an uplink time slot, a downlink time slot, an uplink priority bi-directional time slot, or a downlink priority bi-directional time slot based on the first slot configuration;
   the method further comprising:
   performing a first channel-state information measurement in time slots of the one or more time slots that are designated for downlink time slots semi-statically; and
   performing a second channel-state information measurement in time slots of the one or more time slots that are designated for downlink time slots dynamically in accordance with the first slot configuration.

2. The method of claim 1, further comprising:
   determining, based on the first slot configuration, that a third time slot of the one or more time slots is changed, from a downlink time slot, to an uplink time slot allocated to another UE of the group of UEs; and
   at least one of:
      refraining from decoding a UE specific downlink control channel of the third time slot;
      refraining from conducting a radio resource management (RRM) measurement in the third time slot; and
      refraining from conducting a channel state information (CSI) measurement in the third time slot.

3. The method of claim 1, further comprising:
   determining a gap period in the first time slot based on the first slot configuration.

4. A method of wireless communication of a user equipment (UE), comprising:
   receiving symbols in a first time slot, the first time slot including a control region and a data region;
   attempting to detect, when the UE is configured to detect, a group common downlink control channel carried by the received symbols, the group common downlink control channel containing common information directed to a group of UEs including the UE; and
   when the detection is successful, determining, based on the common information, at least one of
      (a) a first slot configuration of one or more time slots,
      (b) a puncture configuration indicating one or more punctured symbols received in a second time slot, the one or more punctured symbols being initially allocated for carrying enhanced Mobile Broadband (eMBB) data and carrying Ultra-Reliable and Low Latency Communications (URLLC) data, the second time slot being prior to the first time slot,
      (c) a transmission burst duration of a transmission on an unlicensed link, the unlicensed link being in an unlicensed spectrum, and
      (d) one or more sub-regions of the control region containing one or more of the received symbols that are a part of a downlink data channel, the downlink data channel including one or more of the received symbols in the data region;
   wherein the first slot configuration is determined based on the common information, the method further comprising: determining that each of the one or more time slots is an uplink time slot, a downlink time slot, an uplink priority bi-directional time slot, or a downlink priority bi-directional time slot based on the first slot configuration;
   the method further comprising:
   performing a first power control in time slots of the one or more time slots that are designated for uplink time slots semi-statically; and
   performing a second power control in time slots of the one or more time slots that are designated for uplink time slots dynamically in accordance with the first slot configuration.

5. A method of wireless communication of a user equipment (UE), comprising:
   receiving symbols in a first time slot, the first time slot including a control region and a data region;
   attempting to detect, when the UE is configured to detect, a group common downlink control channel carried by the received symbols, the group common downlink control channel containing common information directed to a group of UEs including the UE; and
   when the detection is successful, determining, based on the common information, at least one of (a) a first slot configuration of one or more time slots,
(b) a puncture configuration indicating one or more punctured symbols received in a second time slot, the one or more punctured symbols being initially allocated for carrying enhanced Mobile Broadband (eMBB) data and carrying Ultra-Reliable and Low Latency Communications (URLLC) data, the second time slot being prior to the first time slot,
(c) a transmission burst duration of a transmission on an unlicensed link, the unlicensed link being in an unlicensed spectrum, and
(d) one or more sub-regions of the control region containing one or more of the received symbols that are a part of a downlink data channel, the downlink data channel including one or more of the received symbols in the data region;
wherein the first slot configuration is determined based on the common information, the method further comprising: determining that each of the one or more time slots is an uplink time slot, a downlink time slot, an uplink priority bi-directional time slot, or a downlink priority bi-directional time slot based on the first slot configuration;
the method further comprising:
determining a detection period in each time slot of the one or more time slots based on whether the each time slot is an uplink time slot, a downlink time slot, an uplink priority bi-directional time slot, or a downlink priority bi-directional time slot, the detection period being designated for performing an energy detection for clear channel assessment (CCA).

6. The method of claim 5, further comprising:
determining a symbol period in the detection period based on whether the each time slot is an uplink time slot, a downlink time slot, an uplink priority bi-directional time slot, or a downlink priority bi-directional time slot, the symbol period being designated for transmitting a predetermined tone used for CCA.

7. The method of claim 5, further comprising:
determining an energy detection threshold used for CCA based on whether the each time slot is an uplink time slot, a downlink time slot, an uplink priority bi-directional time slot, or a downlink priority bi-directional time slot.

8. A method of wireless communication of a user equipment (UE), comprising:
receiving symbols in a first time slot, the first time slot including a control region and a data region;
attempting to detect, when the UE is configured to detect, a group common downlink control channel carried by the received symbols, the group common downlink control channel containing common information directed to a group of UEs including the UE; and
when the detection is successful, determining, based on the common information, at least one of
(a) a first slot configuration of one or more time slots,
(b) a puncture configuration indicating one or more punctured symbols received in a second time slot, the one or more punctured symbols being initially allocated for carrying enhanced Mobile Broadband (eMBB) data and carrying Ultra-Reliable and Low Latency Communications (URLLC) data, the second time slot being prior to the first time slot,
(c) a transmission burst duration of a transmission on an unlicensed link, the unlicensed link being in an unlicensed spectrum, and
(d) one or more sub-regions of the control region containing one or more of the received symbols that are a part of a downlink data channel, the downlink data channel including one or more of the received symbols in the data region;
wherein the transmission burst duration is determined based on the common information, the method further comprising:
detecting a start of a downlink transmission on the unlicensed link;
determining that a particular time slot is within the transmission burst duration from the start; and
demodulating symbols received in the particular time slot.

9. The method of claim 8, further comprising:
selecting a time point within the transmission burst duration from the start;
performing, at the time point, a Listen-Before-Talk (LBT) operation without random backoff; and
transmitting data in an uplink on the unlicensed link when the unlicensed link is determined to be clear by the LBT operation.

10. A method of wireless communication of a user equipment (UE), comprising:
receiving symbols in a first time slot, the first time slot including a control region and a data region;
attempting to detect, when the UE is configured to detect, a group common downlink control channel carried by the received symbols, the group common downlink control channel containing common information directed to a group of UEs including the UE; and
when the detection is successful, determining, based on the common information, at least one of
(a) a first slot configuration of one or more time slots,
(b) a puncture configuration indicating one or more punctured symbols received in a second time slot, the one or more punctured symbols being initially allocated for carrying enhanced Mobile Broadband (eMBB) data and carrying Ultra-Reliable and Low Latency Communications (URLLC) data, the second time slot being prior to the first time slot,
(c) a transmission burst duration of a transmission on an unlicensed link, the unlicensed link being in an unlicensed spectrum, and
(d) one or more sub-regions of the control region containing one or more of the received symbols that are a part of a downlink data channel, the downlink data channel including one or more of the received symbols in the data region;
wherein the puncture configuration is determined based on the common information, the method further comprising:
determining that data carried by one or more symbols in the second time slot were not successfully decoded; and
decoding data carried by symbols other than the punctured symbols in the second time slot again or sending a negative acknowledgement.

11. A method of wireless communication of a user equipment (UE), comprising:
receiving symbols in a first time slot, the first time slot including a control region and a data region;
attempting to detect, when the UE is configured to detect, a group common downlink control channel carried by the received symbols, the group common downlink control channel containing common information directed to a group of UEs including the UE; and
when the detection is successful, determining, based on the common information, at least one of (a) a first slot configuration of one or more time slots,
(b) a puncture configuration indicating one or more punctured symbols received in a second time slot, the one or more punctured symbols being initially allocated for carrying enhanced Mobile Broadband (eMBB) data and carrying Ultra-Reliable and Low Latency Communications (URLLC) data, the second time slot being prior to the first time slot,
(c) a transmission burst duration of a transmission on an unlicensed link, the unlicensed link being in an unlicensed spectrum, and
(d) one or more sub-regions of the control region containing one or more of the received symbols that are a part of a downlink data channel, the downlink data channel including one or more of the received symbols in the data region;
when the detection is unsuccessful, decoding UE specific downlink control channel in each of the first time slot and subsequent time slots until successfully detecting a group common downlink control channel in a time slot.

12. A method of wireless communication of a user equipment (UE), comprising:
receiving symbols in a first time slot, the first time slot including a control region and a data region;
attempting to detect, when the UE is configured to detect, a group common downlink control channel carried by the received symbols, the group common downlink control channel containing common information directed to a group of UEs including the UE; and
when the detection is successful, determining, based on the common information, at least one of
(a) a first slot configuration of one or more time slots,
(b) a puncture configuration indicating one or more punctured symbols received in a second time slot, the one or more punctured symbols being initially allocated for carrying enhanced Mobile Broadband (eMBB) data and carrying Ultra-Reliable and Low Latency Communications (URLLC) data, the second time slot being prior to the first time slot,
(c) a transmission burst duration of a transmission on an unlicensed link, the unlicensed link being in an unlicensed spectrum, and
(d) one or more sub-regions of the control region containing one or more of the received symbols that are a part of a downlink data channel, the downlink data channel including one or more of the received symbols in the data region;
when the UE is not configured to detect the group common downlink control channel,
determining whether a second slot configuration of the one or more time slots is received from a layer above a physical layer; and
when the second slot configuration is received, determining each of the one or more time slots is an uplink time slot or a downlink time slot based on the second slot configuration and decoding a UE specific downlink control channel in the each time slot determined to be a downlink time slot.

13. The method of claim 12, further comprising:
decoding a UE specific downlink control channel in each of the one or more time slots when the second slot configuration is received; and
determining the each time slot is an uplink time slot or a downlink time slot based on the decoded UE specific downlink control channel of the each time slot.

14. A user equipment (UE) of a wireless communication system, comprising:
a memory; and
at least one processor coupled to the memory and configured to:
receive symbols in a first time slot, the first time slot including a control region and a data region;
attempt to detect, when the UE is configured to detect, a group common downlink control channel carried by the received symbols, the group common downlink control channel containing common information directed to a group of UEs including the UE; and
when the detection is successful, determine, based on the common information, at least one of
(a) a first slot configuration of one or more time slots,
(b) a puncture configuration indicating one or more punctured symbols received in a second time slot, the one or more punctured symbols being initially allocated for carrying enhanced Mobile Broadband (eMBB) data and carrying Ultra-Reliable and Low Latency Communications (URLLC) data, the second time slot being prior to the first time slot,
(c) a transmission burst duration of a transmission on an unlicensed link, the unlicensed link being in an unlicensed spectrum, and
(d) one or more sub-regions of the control region containing one or more of the received symbols that are a part of a downlink data channel, the downlink data channel including one or more of the received symbols in the data region;
wherein when the UE is not configured to detect the group common downlink control channel, the at least one processor is further configured to:
determine whether a second slot configuration of the one or more time slots is received from a layer above a physical layer; and
when the second slot configuration is received, the at least one processor is further configured to determine each of the one or more time slots is an uplink time slot or a downlink time slot based on the second slot configuration and decode a UE specific downlink control channel in the each time slot determined to be a downlink time slot.

15. The UE of claim 14, wherein the first slot configuration is determined based on the common information, and the at least one processor is further configured to determine that each of the one or more time slots is an uplink time slot, a downlink, an uplink priority bi-directional time slot, or a downlink priority bi-directional time slot time slot based on the first slot configuration.

16. The UE of claim 14, wherein the at least one processor is further configured to:
determine, based on the first slot configuration, that a third time slot of the one or more time slots is changed, from a downlink time slot, to an uplink time slot allocated to another UE of the group of UEs; and
at least one of:
refrain from decoding a UE specific downlink control channel of the third time slot;
refrain from conducting a radio resource management (RRM) measurement in the third time slot; and
refrain from conducting a channel state information (CSI) measurement in the third time slot.

17. A non-transitory computer-readable medium storing computer executable code for a wireless communication system including a user equipment (UE), comprising code to:
receive symbols in a first time slot, the first time slot including a control region and a data region;

attempt to detect, when the UE is configured to detect, a group common downlink control channel carried by the received symbols, the group common downlink control channel containing common information directed to a group of UEs including the UE; and when the detection is successful, determine, based on the common information, at least one of (a) a first slot configuration of one or more time slots, (b) a puncture configuration indicating one or more punctured symbols received in a second time slot, the one or more punctured symbols being initially allocated for carrying enhanced Mobile Broadband (eMBB) data and carrying Ultra-Reliable and Low Latency Communications (URLLC) data, the second time slot being prior to the first time slot, (c) a transmission burst duration of a transmission on an unlicensed link, the unlicensed link being in an unlicensed spectrum, and (d) one or more sub-regions of the control region containing one or more of the received symbols that are a part of a downlink data channel, the downlink data channel including one or more of the received symbols in the data region;

wherein when the UE is not configured to detect the group common downlink control channel, the at least one processor is further configured to:

determine whether a second slot configuration of the one or more time slots is received from a layer above a physical layer; and when the second slot configuration is received, the at least one processor is further configured to determine each of the one or more time slots is an uplink time slot or a downlink time slot based on the second slot configuration and decode a UE specific downlink control channel in the each time slot determined to be a downlink time slot.

* * * * *